US012757879B2

(12) United States Patent
Lawver et al.

(10) Patent No.: US 12,757,879 B2
(45) Date of Patent: Oct. 13, 2026

(54) FISHING ROD WITH SUSPENSION SYSTEM AND METHOD FOR USING SAME

(71) Applicant: PROTEK OFFSHORE LLC, Belgrade, MT (US)

(72) Inventors: Dean Lawver, Belgrade, MT (US); Chris Rager, Bozeman, MT (US)

(73) Assignee: PRO TEK OFFSHORE LLC, Belgrade, MO (US)

( * ) Notice: Subject to any disclaimer, the term of this patent is extended or adjusted under 35 U.S.C. 154(b) by 0 days.

(21) Appl. No.: 18/980,786

(22) Filed: Dec. 13, 2024

(65) Prior Publication Data

US 2025/0107515 A1 Apr. 3, 2025

Related U.S. Application Data

(62) Division of application No. 17/610,689, filed as application No. PCT/US2020/033059 on May 15, 2020, now Pat. No. 12,201,099.

(60) Provisional application No. 62/849,041, filed on May 16, 2019.

(51) Int. Cl.

| | |
|---|---|
| ***A01K 87/08*** | (2006.01) |
| ***A01K 87/00*** | (2006.01) |
| *A01K 87/02* | (2006.01) |
| *A01K 87/04* | (2006.01) |

(52) U.S. Cl.
CPC ............ *A01K 87/008* (2022.02); *A01K 87/00* (2013.01); *A01K 87/08* (2013.01); *A01K 87/02* (2013.01); *A01K 87/04* (2013.01)

(58) Field of Classification Search
CPC .... A01K 87/00; A01K 87/007; A01K 87/008; A01K 87/02; A01K 87/08
USPC ......... 43/18.1 R, 18.1 CT, 25; 482/121, 122, 482/126, 127, 129
See application file for complete search history.

(56) References Cited

U.S. PATENT DOCUMENTS

| | | | | |
|---|---|---|---|---|
| 279,988 A * | 6/1883 | Smith | A01K 87/00 | 43/18.1 R |
| 1,043,397 A * | 11/1912 | Capell | A01K 89/01913 | 242/273 |
| 1,351,473 A * | 8/1920 | Forster | A01K 87/00 | 43/18.1 R |
| 1,513,567 A * | 10/1924 | Swihart | A01K 91/10 | 43/15 |
| 1,593,957 A * | 7/1926 | Roy | A01K 87/00 | 43/18.1 R |
| 1,927,576 A * | 9/1933 | Smith | A01K 87/08 | 43/25 |

(Continued)

FOREIGN PATENT DOCUMENTS

| | | |
|---|---|---|
| CN | 206390069 U * | 8/2017 |
| CN | 206909489 U * | 1/2018 |

(Continued)

OTHER PUBLICATIONS

The Official Emmrod Site, accessed and printed on Nov. 4, 2021 from http://emmrod.com, 7 pages.

*Primary Examiner* — Darren W Ark
(74) *Attorney, Agent, or Firm* — Corner Counsel, LLC

(57) ABSTRACT

An adjustable force transfer portion of a fishing rod that alters the transfer of forces from the distal section to the proximal section of the fishing rod when fighting a fish. The fishing rod may be modular, and the adjustable force transfer portion may be located in any one or more sections of the rod.

3 Claims, 22 Drawing Sheets

(56) References Cited

U.S. PATENT DOCUMENTS

| | | | | | |
|---|---|---|---|---|---|
| 1,985,427 | A * | 12/1934 | Richardson | A01K 87/02 | 43/18.1 R |
| 2,018,923 | A * | 10/1935 | Potter | A01K 87/00 | 43/18.1 R |
| 2,158,104 | A * | 5/1939 | Bowen | A01K 87/08 | 43/25 |
| 2,230,229 | A * | 2/1941 | Benson | A01K 87/00 | 43/18.1 CT |
| 2,269,808 | A * | 1/1942 | Cabassa | A01K 89/015 | 242/396.9 |
| 2,272,010 | A * | 2/1942 | Freeman | A01K 97/10 | 43/25 |
| 2,305,045 | A * | 12/1942 | Torrence | A01K 89/01917 | 43/25 |
| 2,306,638 | A * | 12/1942 | Meisler | A01K 87/02 | 43/18.1 R |
| 2,341,053 | A * | 2/1944 | Mason | A01K 87/00 | 473/289 |
| 2,351,734 | A * | 6/1944 | Backe | A01K 87/02 | 43/18.1 CT |
| 2,478,131 | A * | 8/1949 | Rossi | A01K 87/00 | 43/18.1 R |
| 2,483,071 | A * | 9/1949 | Stine | A01K 87/00 | 43/17 |
| 2,514,929 | A * | 7/1950 | Brandt | A01K 87/04 | 43/25 |
| 2,538,306 | A * | 1/1951 | Fox | A01K 87/00 | 43/18.1 R |
| 2,538,338 | A * | 1/1951 | Sturdevant | A01K 87/00 | 43/18.1 R |
| 2,541,759 | A * | 2/1951 | Hamre | A01K 87/00 | 403/379.3 |
| 2,559,933 | A * | 7/1951 | Briney | A01K 87/00 | 43/18.1 R |
| 2,559,934 | A * | 7/1951 | Briney | A01K 87/00 | 43/18.1 R |
| 2,610,427 | A * | 9/1952 | Caroland | A01K 87/00 | 43/18.1 R |
| 2,759,288 | A * | 8/1956 | Renedict | A01K 87/00 | 43/18.1 R |
| 2,851,811 | A * | 9/1958 | Mantell | A01K 87/00 | 43/18.1 R |
| 3,003,275 | A * | 10/1961 | Reid | A01K 87/00 | 43/18.5 |
| 3,156,998 | A * | 11/1964 | Mcdaniel | A01K 89/015 | 43/25 |
| 3,165,855 | A * | 1/1965 | Stephenson | A01K 91/02 | D22/141 |
| 3,216,144 | A * | 11/1965 | Vojinov | A01K 87/00 | 43/18.1 R |
| 3,245,169 | A * | 4/1966 | Kennel | A01K 87/02 | 403/220 |
| 3,372,509 | A * | 3/1968 | Arsenault | A01K 87/08 | 43/25 |
| 3,372,510 | A * | 3/1968 | Arsenault | A01K 87/08 | 294/58 |
| 3,415,002 | A * | 12/1968 | Schaefer | A01K 87/00 | 43/18.1 R |
| 3,500,570 | A * | 3/1970 | Hubbard | A01K 87/00 | 43/18.1 R |
| 3,507,069 | A * | 4/1970 | Borba, Sr. | A01K 87/00 | 43/18.1 R |
| 3,769,737 | A * | 11/1973 | Miyamae | A01K 87/00 | 43/25 |
| 4,024,666 | A * | 5/1977 | Carver | A01K 87/00 | 43/18.1 R |
| 4,121,369 | A * | 10/1978 | Lopez | A01K 87/002 | 43/18.1 R |
| 4,151,672 | A * | 5/1979 | Lopez | A01K 87/002 | 43/18.1 R |
| 4,162,587 | A * | 7/1979 | Dethlefs | A01K 97/125 | 43/18.1 CT |
| 4,355,061 | A * | 10/1982 | Zeigler | A01K 87/00 | 156/173 |
| 4,539,773 | A * | 9/1985 | Eldridge | A01K 87/00 | 43/25 |
| 4,559,735 | A * | 12/1985 | Batick, Jr. | A01K 97/10 | 43/25 |
| 4,721,174 | A * | 1/1988 | Letzo | G01G 19/60 | 177/225 |
| 4,845,880 | A * | 7/1989 | Miller | A01K 91/02 | 43/19 |
| 5,042,805 | A * | 8/1991 | Nakai | A63B 53/00 | 473/549 |
| 5,231,782 | A * | 8/1993 | Testa | A01K 87/08 | 43/18.1 R |
| 5,363,586 | A * | 11/1994 | Balkenbush | A01K 87/08 | 43/25 |
| 5,381,619 | A * | 1/1995 | Watkins | A01K 87/005 | 43/18.1 HR |
| 5,426,884 | A * | 6/1995 | Makowsky | A01K 87/08 | 43/25 |
| 5,581,931 | A * | 12/1996 | Swisher | A01K 87/08 | 43/21.2 |
| 5,674,165 | A * | 10/1997 | Cohen | A63B 21/4047 | 482/904 |
| 5,930,940 | A * | 8/1999 | Yabe | A01K 87/002 | 43/18.1 R |
| 5,992,079 | A * | 11/1999 | Michels | A01K 87/08 | 43/18.1 R |
| 6,237,274 | B1 * | 5/2001 | Head | B25G 1/06 | 43/25 |
| 6,263,609 | B1 * | 7/2001 | Kollodge | A01K 87/00 | 43/4.5 |
| 6,314,617 | B1 * | 11/2001 | Hastings | A63B 60/12 | 16/431 |
| 6,763,628 | B1 * | 7/2004 | Bartlett | A01K 97/00 | 43/25 |
| 6,931,781 | B2 * | 8/2005 | Markley | A01K 87/04 | 43/18.1 R |
| 7,168,201 | B2 * | 1/2007 | Markley | A01K 87/02 | 43/18.1 R |
| 7,533,484 | B2 * | 5/2009 | Markley | A01K 87/04 | 43/18.1 R |
| 7,854,086 | B2 * | 12/2010 | Huynh | A01K 87/08 | 43/18.1 R |
| 8,590,204 | B1 * | 11/2013 | Al-Mutairi | A01K 91/02 | 43/19 |
| 9,480,244 | B2 * | 11/2016 | Cooper | A01K 87/06 | |
| 11,051,500 | B2 * | 7/2021 | Malcarne | A01K 87/02 | |
| 12,201,099 | B2 * | 1/2025 | Lawver | A01K 87/08 | |
| 2002/0043015 | A1 * | 4/2002 | Hays | A01K 87/08 | 43/25 |
| 2005/0005499 | A1 * | 1/2005 | Markley | A01K 87/04 | 43/18.1 R |
| 2005/0055865 | A1 * | 3/2005 | Markley | A01K 87/02 | 43/18.1 R |
| 2005/0188604 | A1 * | 9/2005 | Timbes | A01K 87/007 | 43/19.2 |
| 2006/0096153 | A1 * | 5/2006 | Jung | A01K 87/02 | 43/18.1 R |
| 2006/0130388 | A1 * | 6/2006 | Markley | A01K 91/02 | 43/18.1 R |
| 2006/0179705 | A1 * | 8/2006 | Markley | A01K 87/08 | 43/18.1 R |
| 2006/0230669 | A1 * | 10/2006 | Markley | A01K 87/08 | 43/25 |
| 2007/0033855 | A1 * | 2/2007 | Jung | A01K 91/02 | 43/18.1 R |
| 2007/0199228 | A1 * | 8/2007 | Johnson | A01M 31/06 | 43/3 |
| 2010/0050496 | A1 * | 3/2010 | Huynh | A01K 87/08 | 43/23 |
| 2010/0251596 | A1 * | 10/2010 | Malcarne | A01K 87/02 | 43/18.1 CT |
| 2015/0272100 | A1 * | 10/2015 | Bournique | A01K 87/00 | 43/25 |

(56) References Cited

U.S. PATENT DOCUMENTS

| | | | | |
|---|---|---|---|---|
| 2015/0327526 | A1* | 11/2015 | Cooper | A01K 89/0192 43/25 |
| 2017/0367309 | A1* | 12/2017 | Morris | A01K 87/08 |
| 2018/0103625 | A1* | 4/2018 | Nemeth | A01K 87/02 |
| 2019/0059345 | A1* | 2/2019 | Flinsky | A01K 87/08 |
| 2020/0344987 | A1* | 11/2020 | Malcarne | A01K 87/06 |
| 2021/0100232 | A1* | 4/2021 | Brandon | A01K 97/08 |
| 2026/0009296 | A1* | 1/2026 | Teodorescu | E21B 17/073 |
| 2026/0150824 | A1* | 6/2026 | Fusillo | A01K 87/08 |

FOREIGN PATENT DOCUMENTS

| | | | | |
|---|---|---|---|---|
| DE | 2636068 | A1 * | 2/1978 | |
| DE | 9102148 | U1 * | 8/1992 | |
| GB | 2239808 | A * | 7/1991 | A63C 5/07 |
| JP | H0744616 | U * | 11/1995 | |
| KR | 100451032 | B1 * | 10/2004 | |
| KR | 101209001 | B1 * | 12/2012 | A01K 87/00 |
| KR | 101273653 | B1 * | 6/2013 | A01K 87/009 |
| WO | WO-9504458 | A1 * | 2/1995 | A01K 87/04 |
| WO | WO-2005000014 | A2 * | 1/2005 | A01K 87/04 |

* cited by examiner

FISHING ROD WITH SUSPENSION SYSTEM AND METHOD FOR USING SAME

CROSS REFERENCE TO RELATED APPLICATION

This application is a divisional of U.S. patent application Ser. No. 17/610,689, filed Nov. 11, 2021 which is a National Stage Entry of PCT/US20/33059, filed May 15, 2020, which claims the benefit of U.S. Provisional Application No. 62/849,041, filed on May 16, 2019, the disclosure of which is incorporated herein by reference in its entirety.

FIELD OF THE INVENTION

This disclosure relates to sporting equipment, and more specifically to a fishing rod with a suspension system.

BACKGROUND OF THE INVENTION

Fishing is nearly as old as mankind. Fishing rods are commonly used in conjunction with a hook and bait to catch fish. Fishing rods are typically straight when not loaded, and have a reel attached to them which contains a spool of fishing line. There are many different ways in which a rod and reel are connected.

Typically, the proximal section, or "butt" of the rod (i.e., the portion closer to the body of a user, who is known as "an angler") is more rigid than the distal section (i.e., the portion farther from the angler's body) because the area to which the reel mounts needs to be rigid in order to prevent the rod from failing at the attachment point.

Fishing rods come in many different lengths and flexibility levels depending on the type of fishing the angler will be encountering, or type of fish the angler is setting out to catch. Generally, a relatively shorter, more rigid rod would be used when fishing for larger fish and a relatively longer, more flexible rod for smaller fish. The reason for using a shorter rod for larger fish is to help bring the force of the fighting fish closer to the angler's body and allowing the angler to gain more leverage therefore reducing fatigue to the angler.

Fishing rods are typically built with multiple sections that serve different functions. A tip section, or distal section, is generally more flexible than the rest of the rod. This flexibility accommodates fish movement while maintaining sufficient force on the line to keep the hook set in the fish's mouth. If the rod is too flexible, a fish may dislodge the hook because of insufficient force applied to the hook-mouth junction. An intermediate section of the rod is typically more rigid that the distal section but still allows for some flexion, and importantly, transfers the load created by a hooked fish from the distal section to the butt, or proximal section, so that the angler can counteract that load and also "feel" what the fish is doing at the end of the line. The proximal section tends to be relatively rigid since, among other things, it serves as the anchor point for the reel and therefore requires a strong stable platform.

In helping to prevent the loss of the fish, it is important that the fishing rod has the ability to flex. Flexure of the rod maintains a more uniform force on the fish and absorbs any shock created when a fish changes direction, or when the fish and/or angler rapidly applies a force to the rod. Without rod flex, a hooked fish could more easily disengage the hook or could potentially break the line.

A conventional linear shaped fishing rod, in itself, is not ergonomically comfortable to an angler. When a fish is caught on a fishing rod, the angler typically uses one hand to grip the fishing rod, and the other to reel in line to bring the fish closer to the angler. A fish on the line generally exerts a force that causes the fishing rod to be pulled downward and away from the angler's grip, and so the angler compensates. Particularly with large, heavy and/or strong fish, an angler typically retains the proximal section/butt of the rod at his or her waist, pivots the rod up to draw the fish closer, and then lowers the rod down while reeling in the slack in the line created by lowering the rod. This up and down cycle, which may be quite strenuous, often occurs many times. Further, because of the significant forces applied through the rod to the angler, and the awkward hand positions of the angler while reeling, fatigue is often experienced in the angler's arm that holds the rod, as well as in the angler's back and other parts of the body. This is exacerbated, and may also become painful, because all these forces are typically on only one side of the angler's body during fish retrieval. That is because most fishing reels are either right or left-handed, thus preventing an angler from switching hands on the rod and reel during a fish fight.

Furthermore, when line is retrieved, an angler must manage the retrieved line so that it does not foul the reel. Some prior art fishing rods do not facilitate managing line retrieval and make it difficult to avoid line buildup on portions of the reel.

Therefore, there is a long-felt need for an apparatus and method for a fishing rod that helps alleviate angler strain during fish retrieval, as well as help prevent line fouling. The present invention addresses these needs.

SUMMARY OF THE INVENTION

The invention relates generally to a fishing rod with a grip, or distal handle, that is canted relative to the axis of the fishing rod. The grip cants upwardly, if the rod is horizontal. The improved grip creates a more natural hand position for an angler, which reduced fatigue. The improved grip also extends above the axis of the fishing rod, which creates a mechanical advantage for the angler, which further reduces fatigue because, with the mechanical advantage, less force is needed to rotate the rod through an arc as a fish is retrieved. Importantly, a variable force transfer member and pivot join the butt section to the tip section. The variable force transfer member increases the force transferred to the butt as the pivot rotates from its rest position—more force is transferred as the tip section rotation relative to the butt section increases. In some embodiments, the variable force transfer member mimics the force transfer characteristics of the mid-section of a rod.

In one embodiment, a line guide facilitates manipulation of the retrieved line suspension system.

The invention is further directed to a fishing rod having a pivot point and suspension system built closer to the mid-section of the fishing rod that allows for improved rod control by distributing more of the force while fighting a fish closer to the angler's grip, thus improving the anglers leverage while reducing fatigue.

In one aspect, the fishing rod has at least two sections wherein the two or more sections are connected at a pivot point located in front of the reel when mounted to the rod and wherein there is one or more shock absorbing systems connected between the two or more sections.

In another aspect, the fishing rod has at least two sections wherein the two or more sections are connected at a pivot point located in front of the reel when mounted to the rod wherein there is one or more torsion springs connected to the two or more sections.

In another aspect, the fishing rod has at least two sections wherein the two or more sections are connected at a pivot point located in front of the reel when mounted to the rod wherein there is one or more hydraulic shock absorbers connected to the two or more sections.

The invention further relates to a fishing rod wherein the two or more sections are connected at a pivot point in front of the reel mount and also connected with a suspension system. A fishing rod wherein the pivot point and suspension system allows the angler, while fighting a fish to be able to gain leverage by bringing the resistance of the fight closer to the angler's grip while still allowing the forward section of the fishing rod to be in the most desirable position to properly fight a fish. In an embodiment, the sections would be connected at a pivot point in front of the reel mount and have a suspension system such as gas charged shock, torsion spring, coil spring, hydraulic spring etc. that also connects between the independent sections.

In one embodiment, a fishing rod having a long axis includes a proximal section coupled to an intermediate section which is coupled to a distal section. The intermediate section comprises an actuator adapted to alter a bending force imparted on the fishing rod.

In one embodiment, a fishing rod having a long axis includes a means for altering a bending force imparted on the fishing rod. The means for altering a bending force imparted on the fishing rod may be adjustable in an embodiment. In various embodiments, the means for altering a bending force imparted on the fishing rod may include a shock absorber or a riser containing a plurality of washers.

This Summary of the Invention is neither intended nor should it be construed as being representative of the full extent and scope of the present disclosure. The present disclosure is set forth in various levels of detail in the Summary of the Invention as well as in the attached drawings and the Detailed Description, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

It is understood that these features described above can be combined in any manner to provide a fishing rod in accordance with this disclosure.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the disclosure and, together with the general description of the disclosure given above and the detailed description of the drawings given below, serve to explain the principles of the disclosures.

It should be understood that the drawings are not necessarily to scale. In certain instances, details that are not necessary for an understanding of the disclosure, or that render other details difficult to perceive, may have been omitted. It should be understood, of course, that the disclosure is not necessarily limited to the particular embodiments illustrated herein.

DETAILED DESCRIPTION

Figure 1:
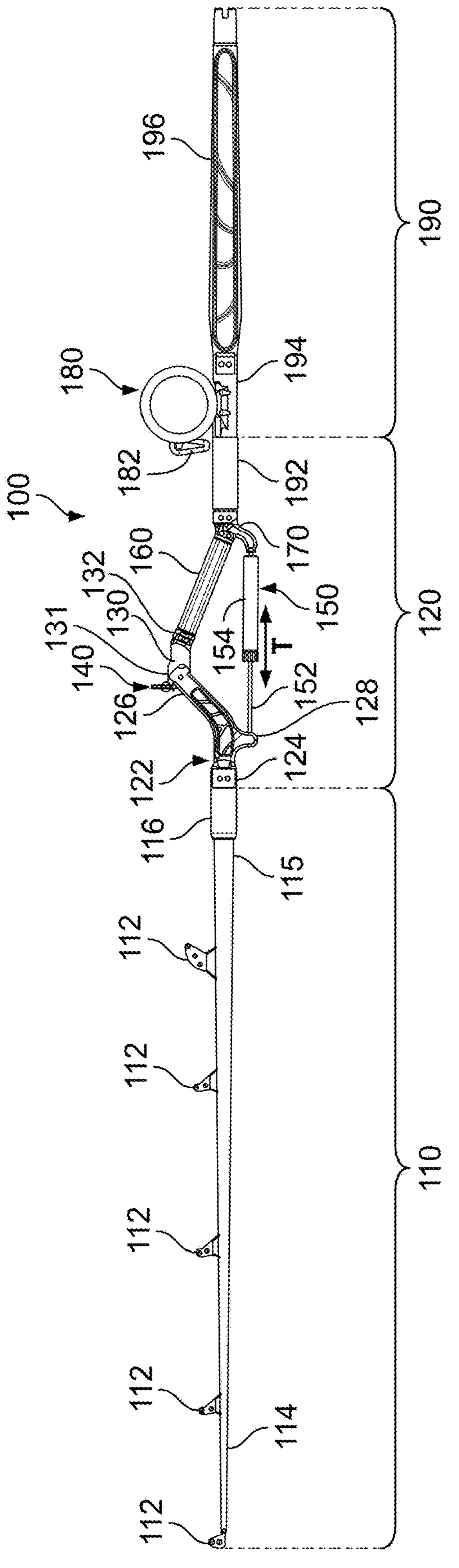
FIG. 1 is a left side view of a fishing rod according to a first embodiment of the present invention.
Figure 2:
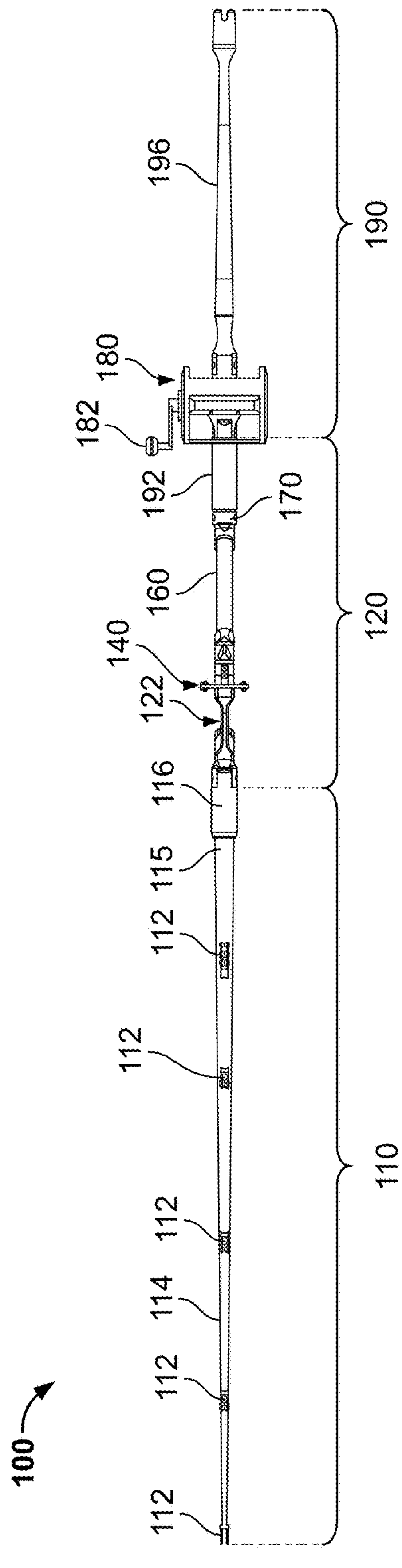
FIG. 2 is a top view of the fishing rod of FIG. 1.
Figure 3:
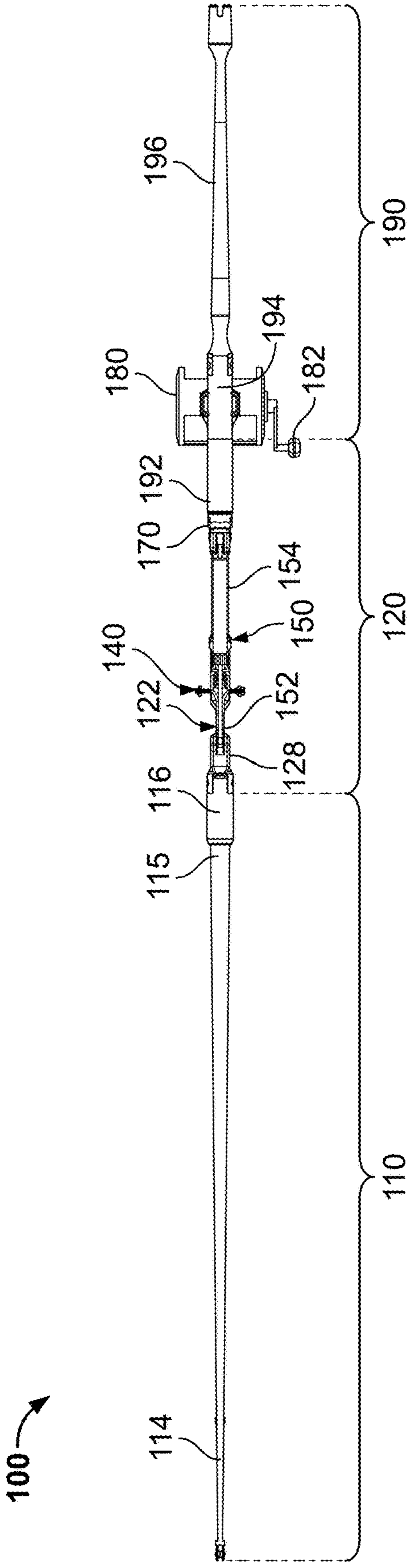
FIG. 3 is a bottom view of the fishing rod of FIG. 1.
Figure 4:
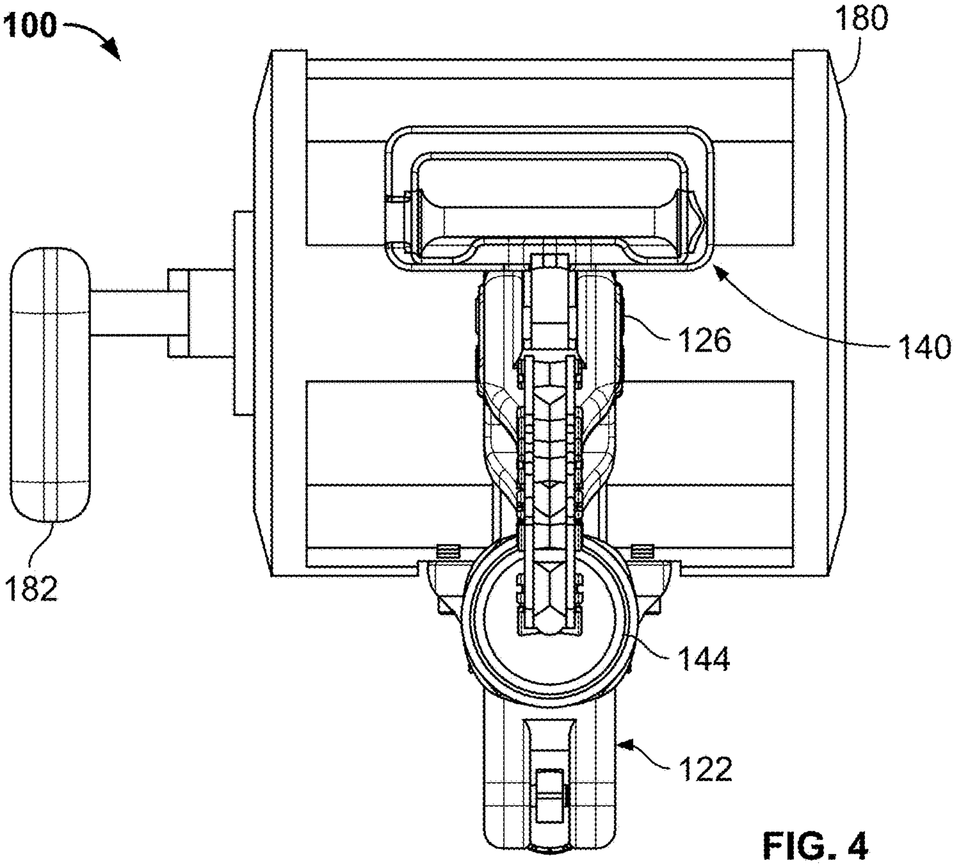
FIG. 4 is a front view of the fishing rod of FIG. 1.
Figure 5:
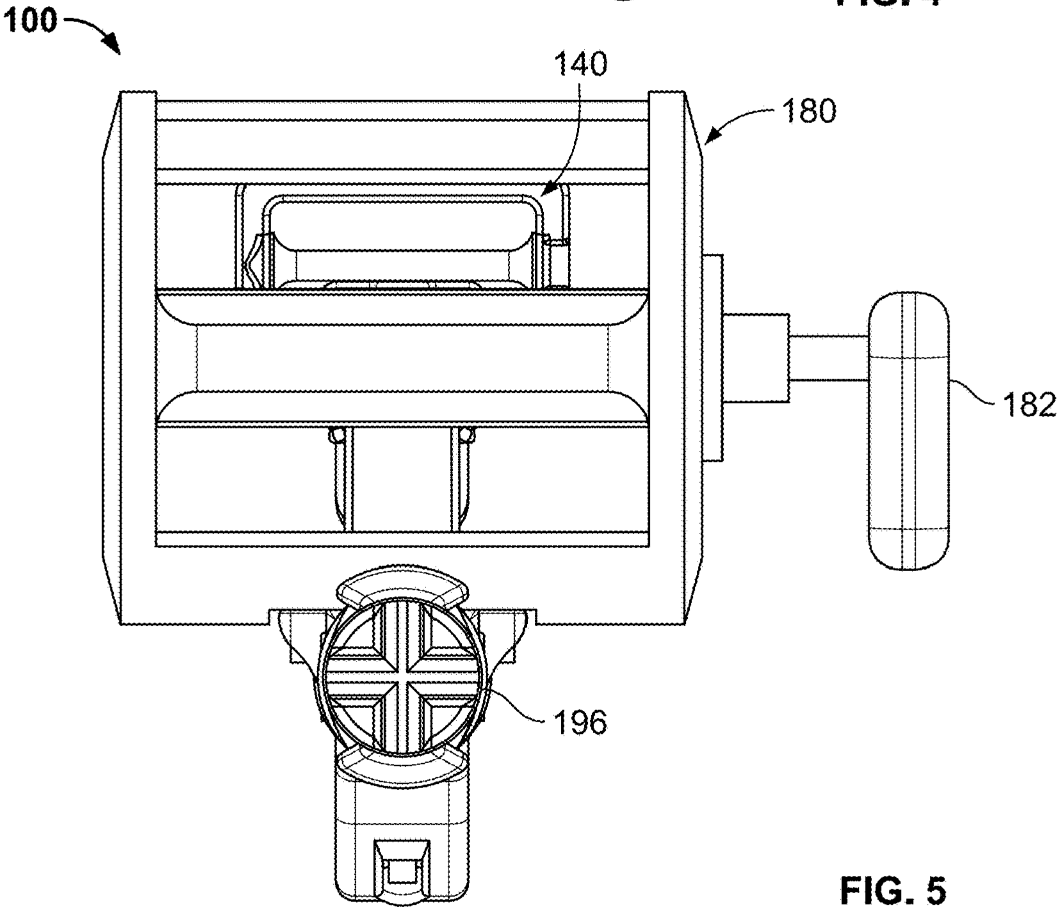
FIG. 5 is a rear view of the fishing rod of FIG. 1.
Figure 6:
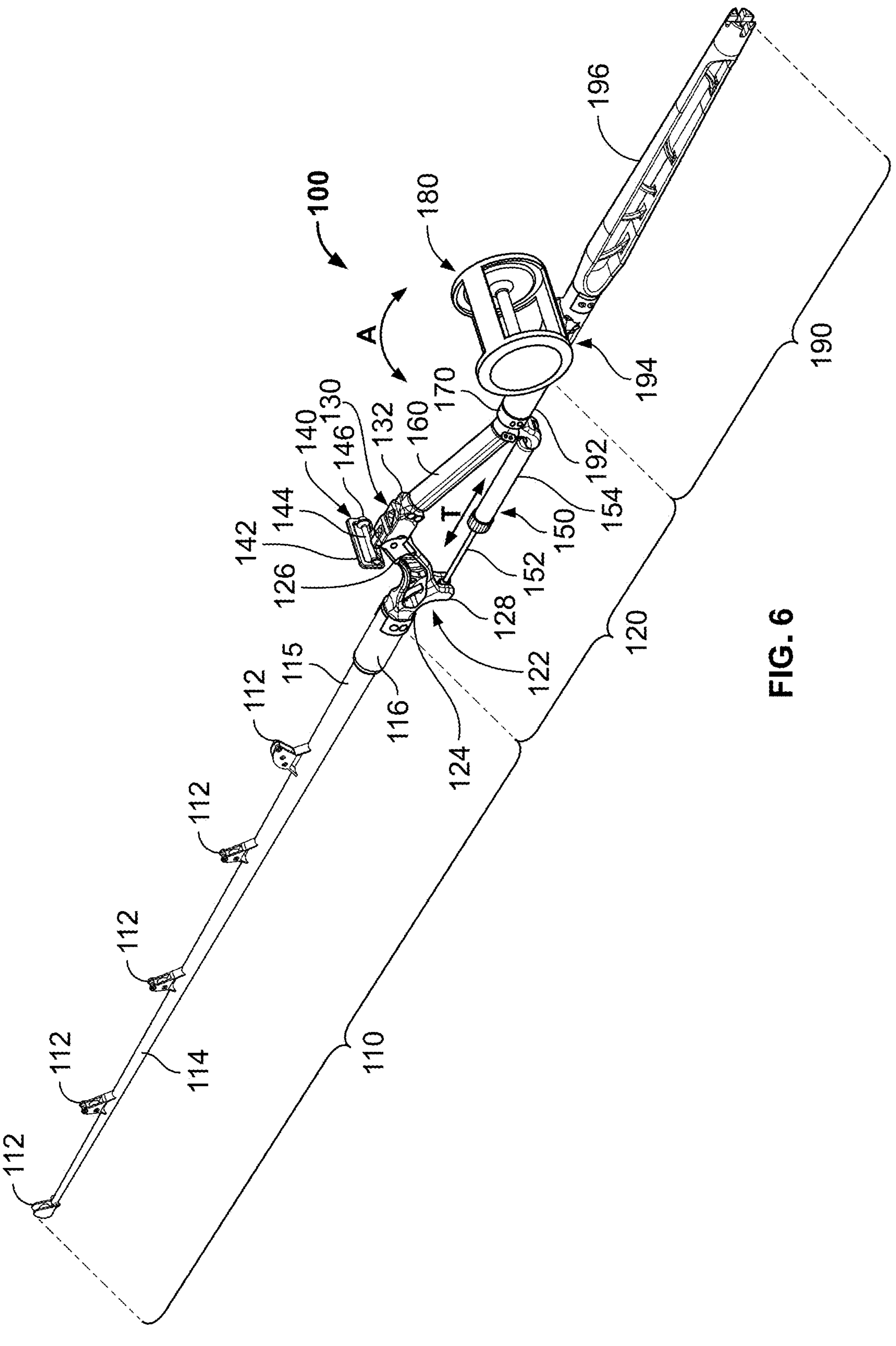
FIG. 6 is a top perspective view of the fishing rod of FIG. 1.
Figure 7:
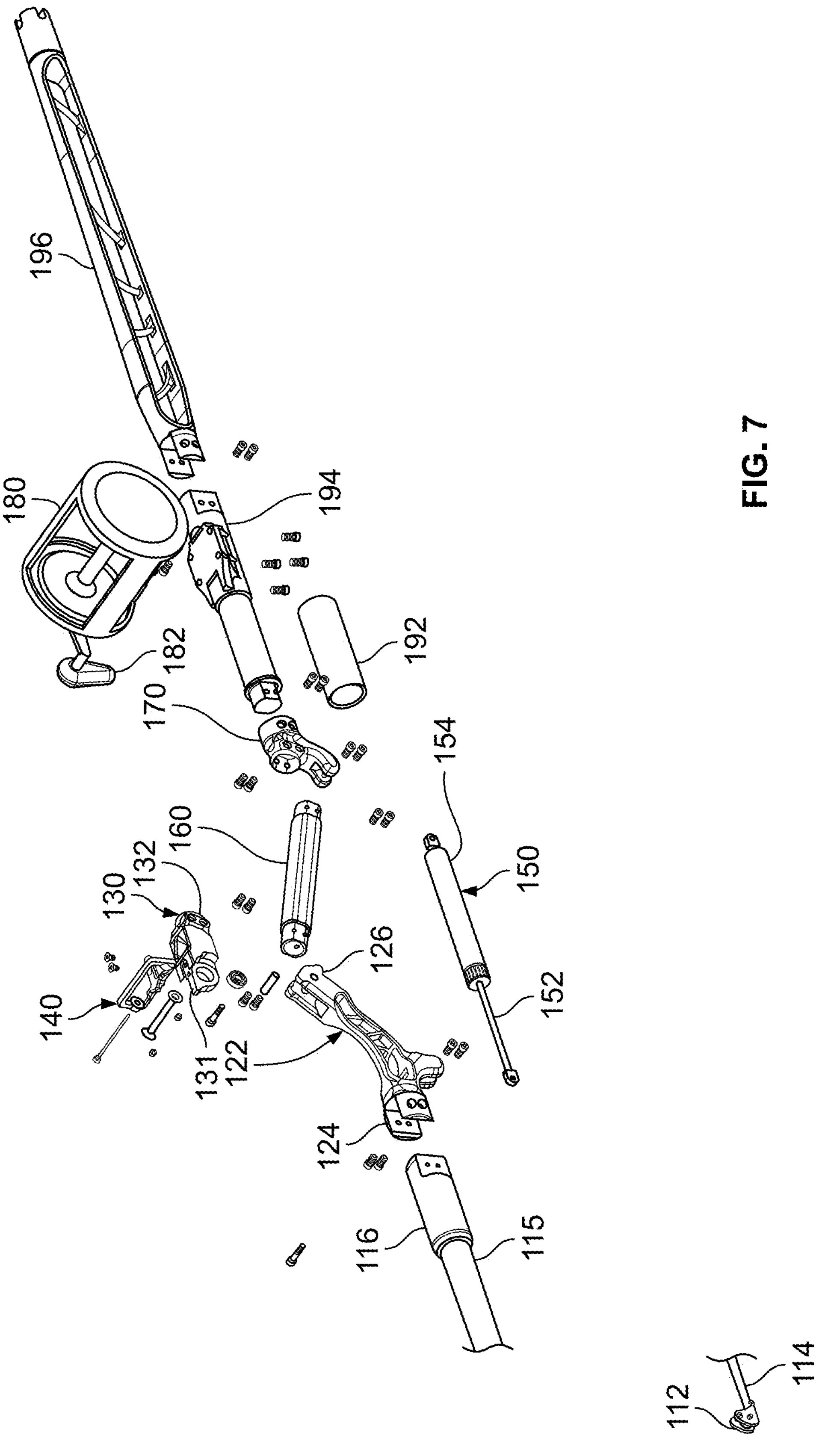
FIG. 7 is an exploded view of select components of the fishing rod of FIG. 1.
Figure 8:
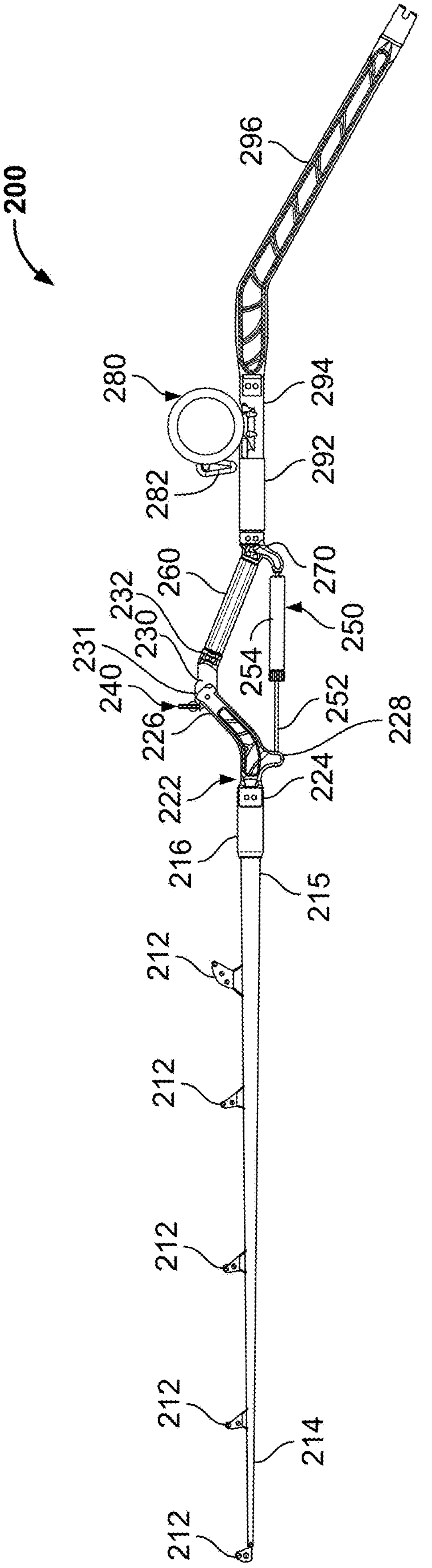
FIG. 8 is a left side view of a second embodiment of a fishing rod according to the present invention.

In the following description of the invention, reference is made to the accompanying drawings which form a part hereof, and in which are shown by way of non-limiting illustration, specific embodiments in which the invention may be practiced. Like reference numerals designate like elements where appropriate, and reference numerals with the addition of one-hundred or multiples thereof designate modified elements in alternate embodiments of the invention that are understood to incorporate the same features and benefits of the corresponding elements. It is to be understood that other embodiments may be contemplated, and structural changes may be made, without departing from the scope of the present invention.

The term "proximal" generally identifies a relative location that is closer to a user, or in this case to the angler, while the term "distal" means farther away.

FIGS. 1-7 depict one embodiment of a fishing rod 100 comprised of three general sections coupled together: a tip, or distal section 110; an intermediate section 120; and a butt, or proximal section 190. Each of the three sections are discussed in detail below.

Distal section 110 has a plurality of eyelets 112 mounted on a shaft 114. Shaft 114 has a proximal end 115 with a coupler 116. Coupler 116 facilitates a rigid, secure connection of distal section 110 to intermediate section 120.

In one embodiment, intermediate section 120 has a distally located coupler, or split coupler 122, in the general shape of a "Y" or "T". Other shapes and configurations that accomplish the same purposes, as described below, are contemplated. Split coupler 122 has a stem 124, a hinge end 126 and a shock end 128. Stem 124 of split coupler 122 is configured to securely connect to coupler 116 of distal section 110, thus making for a rigid connection. In various embodiments, the connection is accomplished by screws, pins, rivets, or any other known method in the art, along with a variety of complimentary mating surfaces (see, e.g., FIG. 7).

An actuator is provided within the intermediate section 120 for transmitting force from distal section 110 to proximal section 190, and thereby enhance the ability of the angler to play a hooked fish, while reducing the angler's fatigue in battling the fish. In various embodiments, the actuator is a shock absorber 150 having a piston 152 and chamber 154. Alternate embodiments with other types of actuators are discussed below.

Shock end 128 of split coupler 122 is connected to piston 152 of shock absorber 150. In various embodiments, this connection may be a pivotable connection or a fixed connection. The functionality of this connection is discussed below.

As is known for shock absorbers, piston 152 rides inside of chamber 154. The amount of force with which piston 152 may be moved into or out of chamber 154 may be controlled as is known in the art. For example, a relatively similar, albeit larger, shock absorber and control mechanism, sometimes called a "screen door closer" is known to be used with residential storm doors in adjusting and controlling the rate at which such a door closes. Another example is an automobile suspension system, which typically includes hydraulic shock absorbers and/or springs or torsion bars. Shock absorbers are also known as spring-dampers or dashpots, and may be either fixed-or adjustable-force and impact control mechanisms. These are all known in the art.

In one embodiment, hinge end 126 of split coupler 122 is connected to a line-guide coupler, or LG coupler 130, at LG coupler's 130 distal end 131. In various embodiments, this connection is either a pivotable connection or a fixed connection. The functionality of this connection is discussed below. At its opposite, proximal end 132, LG coupler 130 is connected to a distal handle 160. In various embodiments, the connection between LG coupler 130 and distal handle 160 is either a fixed or pivotable connection, as further discussed below.

A line guide 140 is mounted on the top of LG coupler 130. Line guide 140 comprises a frame 142 having an opening 144 through which a fishing line (not shown for the sake of clarity) passes, and a pointer 146 that is configured to slidably engage (i.e., travel side-to-side via a worm gear, for example, on) frame 142 (see FIG. 6). Pointer 146 guides the fishing line (not shown) as it comes in and spools onto reel 180 so that the line spools evenly rather than all in one location on reel 180. Unevenly spooled line tends to cause many different problems as known in the art, and so is desirable to avoid.

In the embodiment of FIGS. 1-7, the reel 180 is a typical deep-sea, or trolling, reel, mounted on the upper-facing surface of the rod 100. Eyelets 112 are also correspondingly mounted on the upper-facing surface of the rod 100.

In one embodiment, line guide 140 is manually actuated, such that an angler would move the pointer 146 manually from side to side while reeling in the fishing line. In another embodiment, line guide 140 may be automatic/automated and synched to move with the speed at which line is being reeled in.

The proximal end of distal handle 160, and the proximal end of shock absorber 150 (at the proximal end of chamber 154), are each independently connected to dual coupler 170 via fixed or pivotable connections, as discussed below. Dual coupler 170 is, in turn, rigidly connected to coupler 192. Coupler 192, and its connection to dual coupler 170, may be similar in design, nature, kind and purpose to that of coupler 116 and its connection to split coupler 122.

Coupler 192 engages the distal end of proximal section 190 of rod 100. Proximate this coupler 192, proximal section 190 further includes an anchor section 194 where reel 180 may be affixed, or anchored, to rod 100. Any means known in the art for connecting a reel to a rod are contemplated to be employed for connecting reel 180 to rod 100 at anchor section 194.

Proximate anchor section 194, and closest to the angler, is proximal handle 196 of fishing rod 100.

In one embodiment of the invention, the shock absorber 150 is fixedly, or non-rotatably, connected to each of split coupler 122 and dual coupler 170. This embodiment further has a pivotable connection between hinge end 126 of split coupler 122 and LG coupler 130. It is contemplated that this connection may be designed with stops, for example, to limit the amount of rotation. The connection between LG coupler 130 and distal handle 160 is rigid. The connection between distal handle 160 and dual coupler 170 is pivotable.

In one embodiment of using rod 100, a large fish, such as a 100 pounder or more, gets hooked on the line, whereupon the angler grips distal handle 160 of the rod 100 with one hand, grips the handle 182 of the reel 180 with the other hand, and presses the proximal end of proximal handle 196 against his or her body (e.g., waist). Since distal handle 160 is oriented at an angle to the long axis of rod 100, such as at a 30 degree rise thereto, although all other angles are contemplated, this allows the angler to grip distal handle 160 in a more anatomically neutral and comfortable manner, causing less bending of his or her wrist.

As the angler applies a force to raise fishing rod 100 to draw a hooked fish closer, that force is more effectively and advantageously applied through distal handle 160, which extends above the longitudinal axis of rod 100, rather than in-line/linearly with it. Elevating and re-orienting the angler's grip point—distal handle 160—improves the angler/fishing rod kinematics, namely all of the movements and angler's muscle groups required to accomplish them, thereby reducing the stress on the angler. Additionally, having distal handle 160 elevated in relation to proximal handle 196 and the longitudinal axis of rod 100 reduces the tendency for rod 100 to want to roll around its long axis, which tendency is caused when an angler is reeling in the fish and inadvertently cantilevering the reel 180 in the process.

When a fish is hooked, such fish applies a downward and outward force to distal section 110 of rod 100. That force is counteracted by the force applied by the angler in pulling back (i.e., in a direction towards him- or herself) on distal handle 160, together with the angler pinning the proximal end of proximal handle 196 of proximal section 190 against his or her body (e.g., waist) to prevent rotation of rod 100 around what would be a pivot point on distal handle 160 where he or she is holding it. This pivot point (or pin-point) provides anchorage for rod 100, which then behaves as a cantilevered beam.

Intermediate section 120 can be viewed as having a substantially triangular configuration, although, of course, other similarly functioning configurations are contemplated. At the "bottom" or base of the triangle is shock absorber 150 which compresses and expands along travel arrow T (see FIGS. 1 and 6). At the distal leg of the triangle is split coupler 122, which does not move. At the proximal leg of the triangle is distal handle 160, which travels along arc A (see FIG. 6). All of the connections of these components are selected from fixed and movable joints to enable this action to occur.

As rod 100 bends (i.e. in response to the aforementioned forces acting on it), shock absorber 150 compresses linearly along arrow T and distal handle 160 rotates upwards along arc A such that the angle formed between split coupler 122 and distal handle 160 decreases, and the angle between distal handle 160 and the longitudinal axis of the rod 100 (as exemplified by the angle formed between distal handle 160 and shock absorber 150) increases. As the rod 100 straightens out, the reverse sequence occurs-shock absorber 150 expands/extends linearly along arrow T, distal handle 160 rotates downwards along arc A, and the relative angles between the described parts change, respectively.

The ability to control the attenuation of shock absorber 150, coupled with the improved positioning of, and transmission of the angler's forces through, distal handle 160, enhances the ability of the angler to play a hooked fish, while reducing the angler's fatigue in battling the fish.

In various embodiments, the resistance of shock absorber 150 may be adjusted during the fish-retrieval process to adjust for the weight of the fish or for any other one or more factors. One of skill in the art will recognize that in various alternate embodiments, shock absorber 150 can be supplemented with, or replaced by a gas charged shock absorber, and/or that other mechanisms, such as torsion springs, coil springs, hydraulic springs, and so on, could be used to transfer force from distal section 110 to proximal section 190 of rod 100.

In various embodiments, rod 100 may be modular, customizable and assembled with components having different characteristics. For example, in one embodiment, distal section 110 has a stiffer shaft 114. Just like with a residential screen door shock absorber that has infinite adjustability, or other similar known devices, shock absorber 150 of intermediate section 120 may then be dialed in to resist extension and compression accordingly, and as desired by the angler. Alternatively, rod 100 may not be modular, but still allow for the same adjustment of shock absorber 150.

In embodiments where line guide 140 is not desired, then it, and even LG coupler 130, may be removed from rod 100, such that the distal end of distal handle 160 is directly connected through a pivotal joint to hinge end 126 of split coupler 122. Still further, it may be desired to have certain of the connection points in intermediate section 120 be pivotable, or variable, and not be fixed, and vice versa. Doing so can achieve different movements and kinematics of rod 100, while still being within the scope of the invention.

In various embodiments, rather than having infinite adjustability, the actuator of rod 100 (i.e., shock absorber 150) has a first force profile in which force transferred by the actuator increases at a first rate as distal section 110 rotates downward relative to proximal section 190. And in various embodiments, the actuator also has a second force profile in which the force transferred by the actuator increases at a second rate as distal section 110 rotates downward relative to proximal section 190, and the actuator is adapted to switch between the first force profile and the second force profile upon angler input. This may be accomplished through known mechanisms in the art, such as through a mechanical switch, button or knob on the actuator.

Many variations to the hardware and structures described above are contemplated. Embodiments including such variations are described below.

Figure 9:
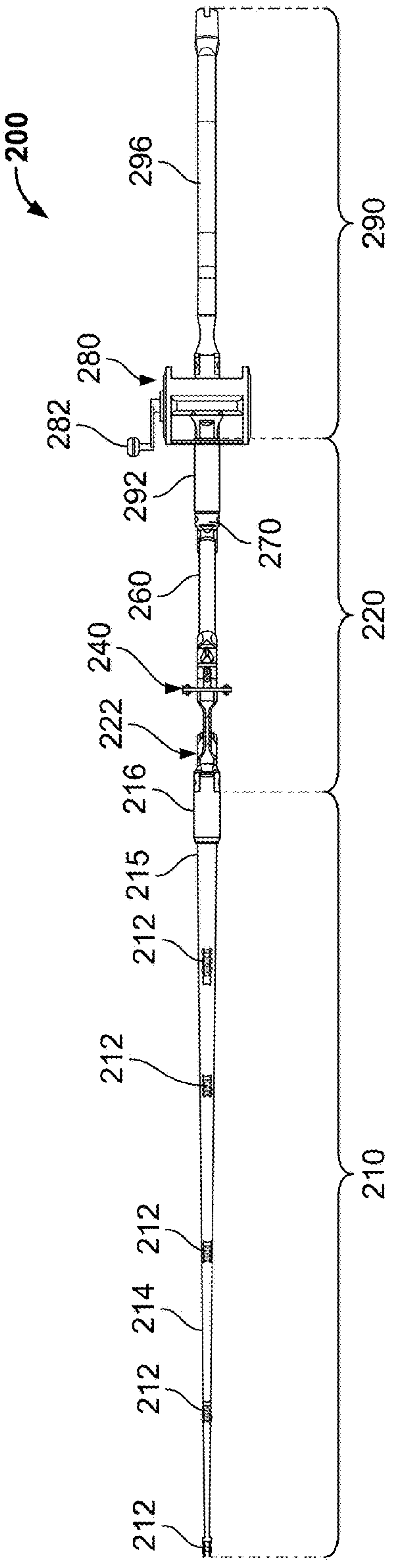
FIG. 9 is a top view of the fishing rod of FIG. 8.
Figure 10:
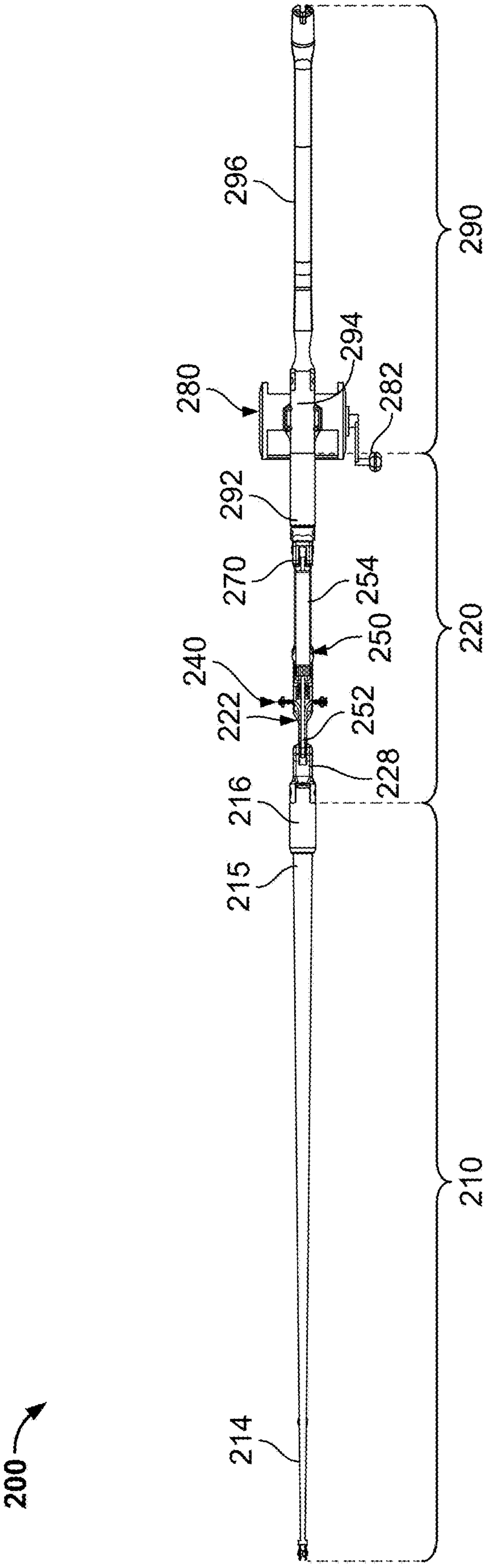
FIG. 10 is a bottom view of the fishing rod of FIG. 8.
Figure 11:
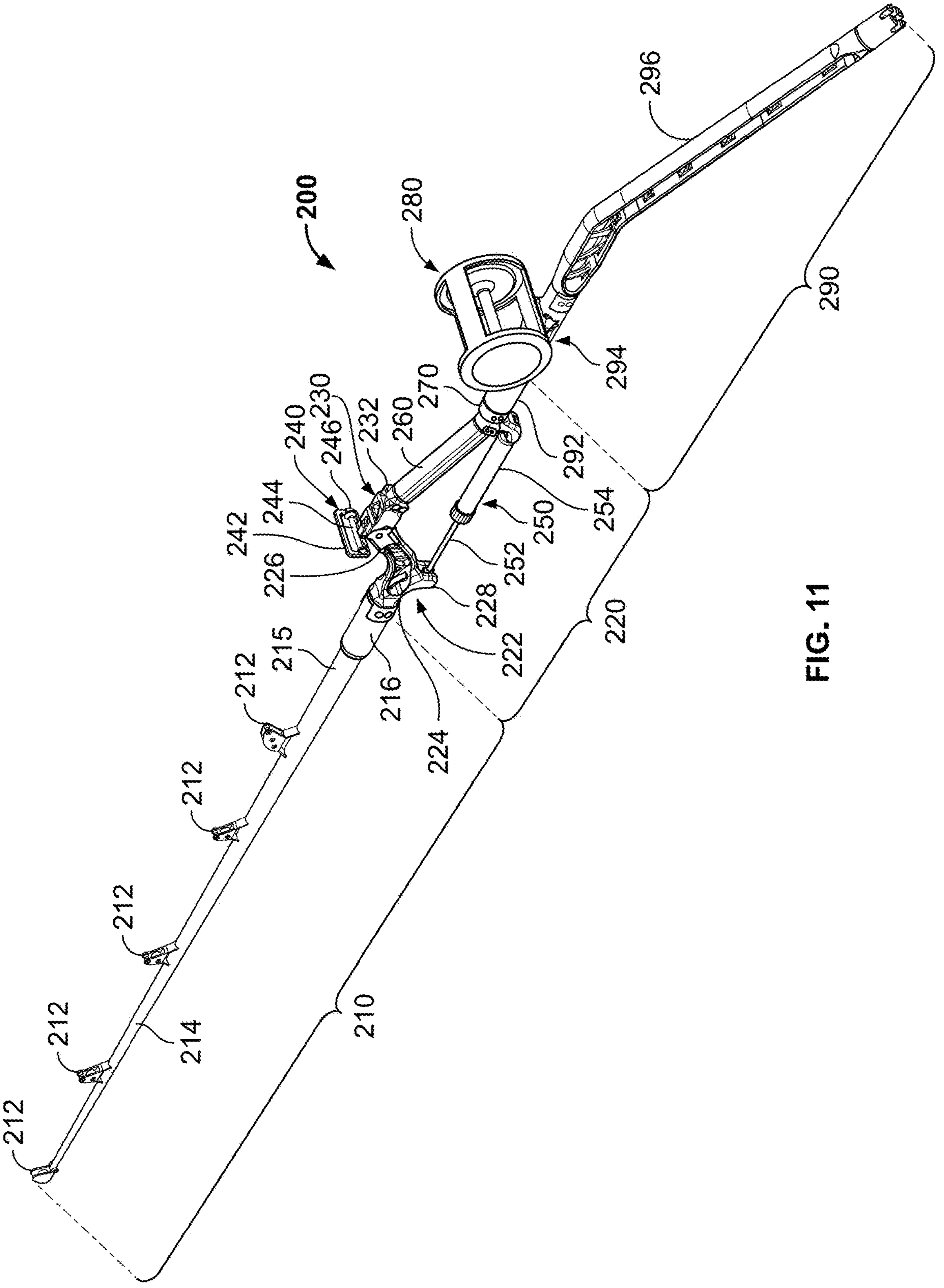
FIG. 11 is a top perspective view of the fishing rod of FIG. 8.
Figure 12:
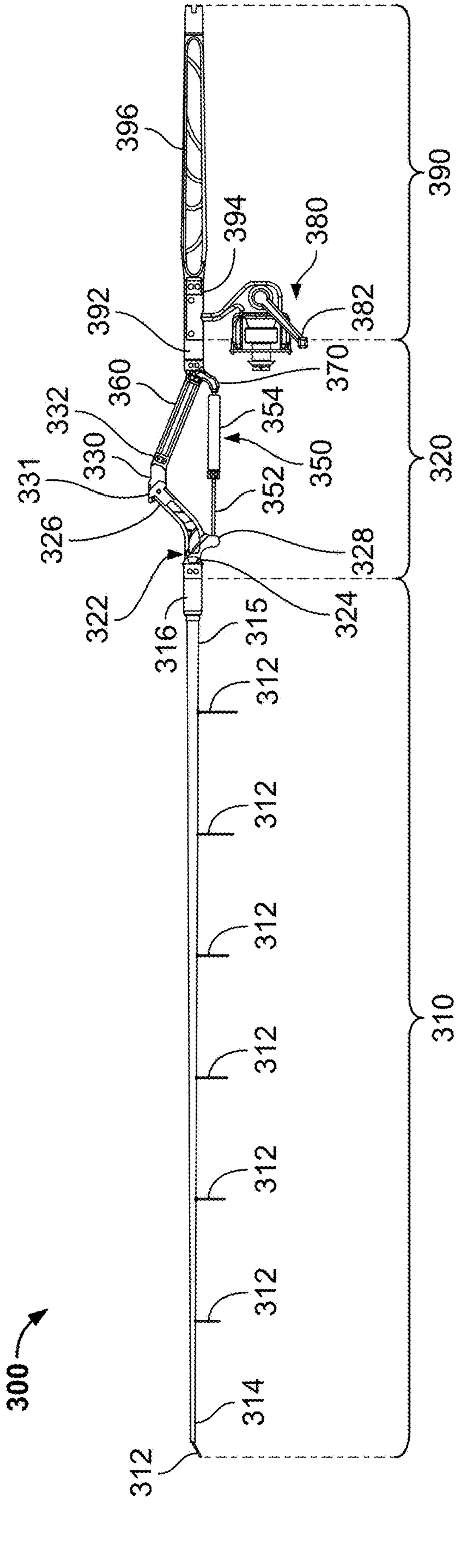
FIG. 12 is a left side view of a third embodiment of a fishing rod according to the present invention.
Figure 13:
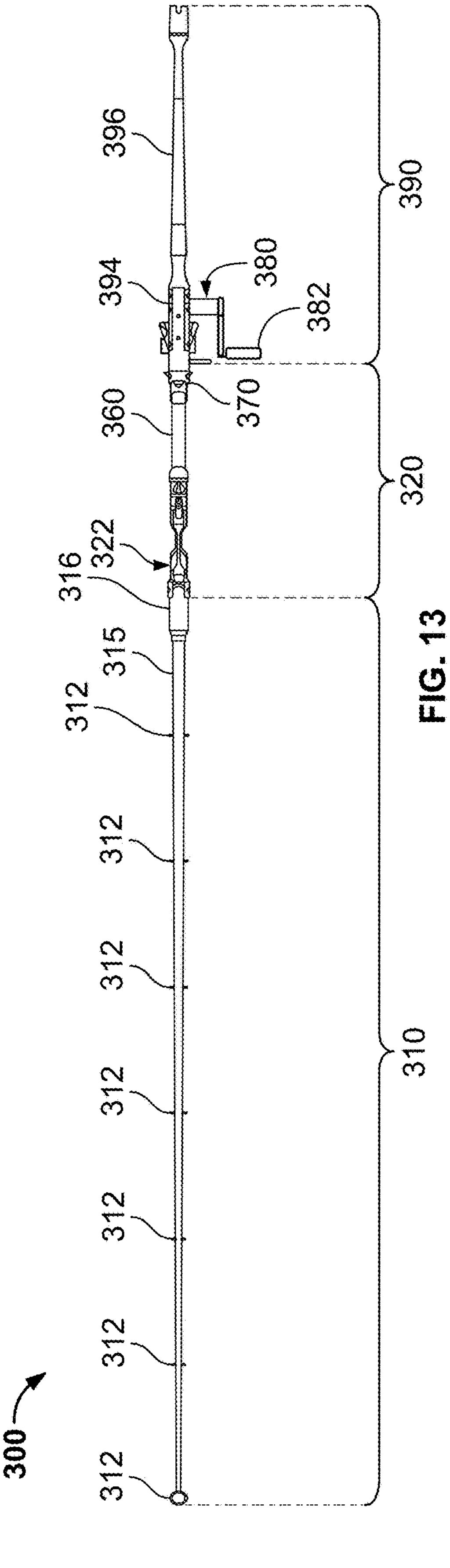
FIG. 13 is a top view of the fishing rod of FIG. 12.
Figure 14:
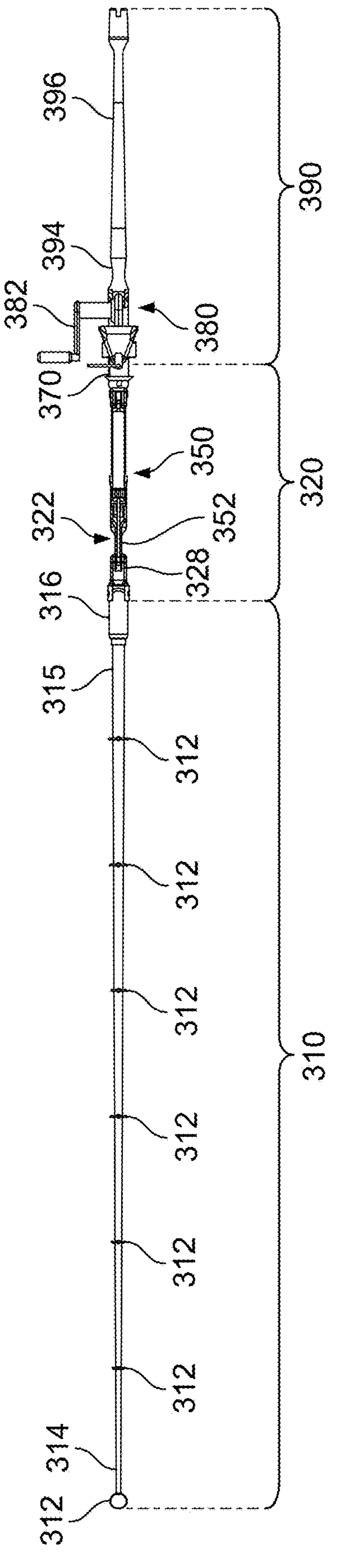
FIG. 14 is a bottom view of the fishing rod of FIG. 12.
Figure 15:
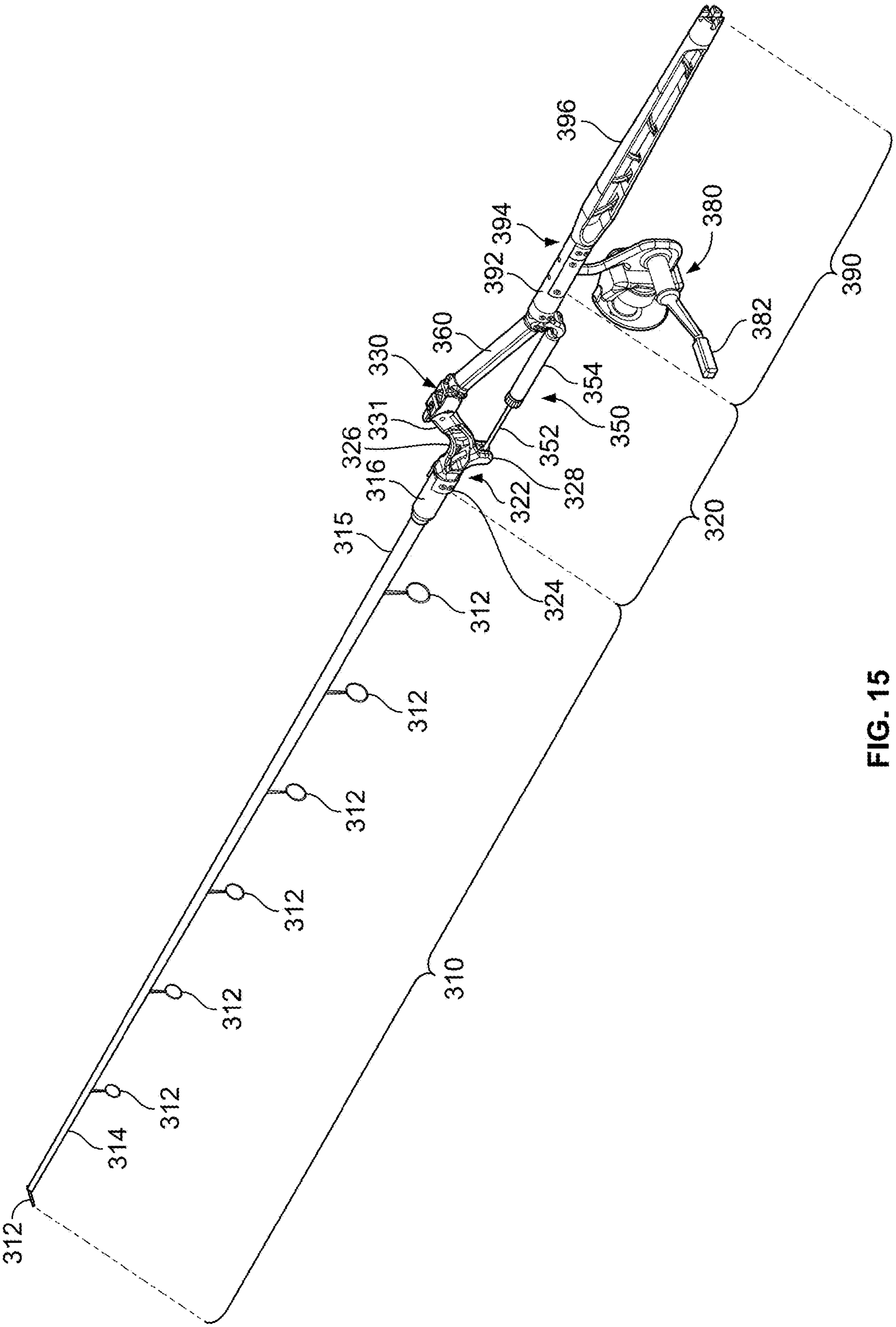
FIG. 15 is a top perspective view of the fishing rod of FIG. 12.
Figure 16:
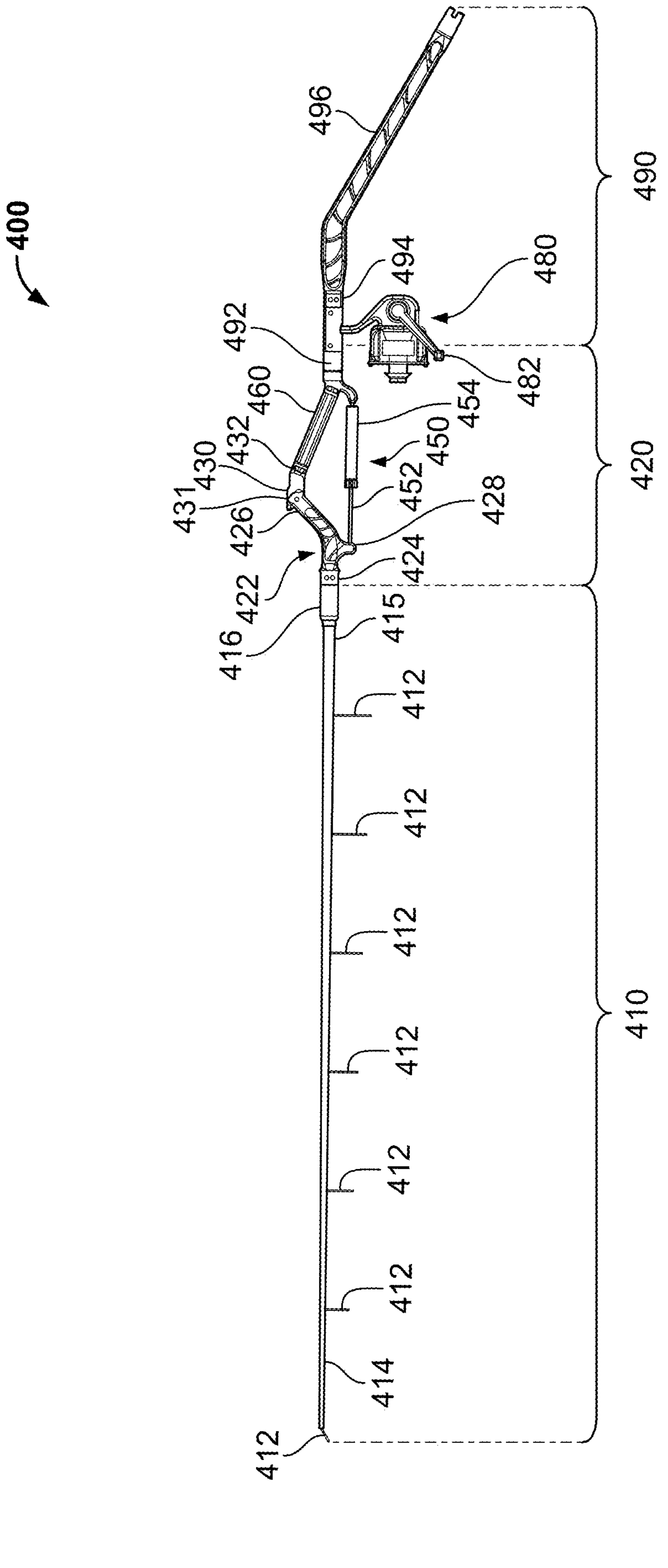
FIG. 16 is a left side view of a fourth embodiment of a fishing rod according to the present invention.
Figure 17:
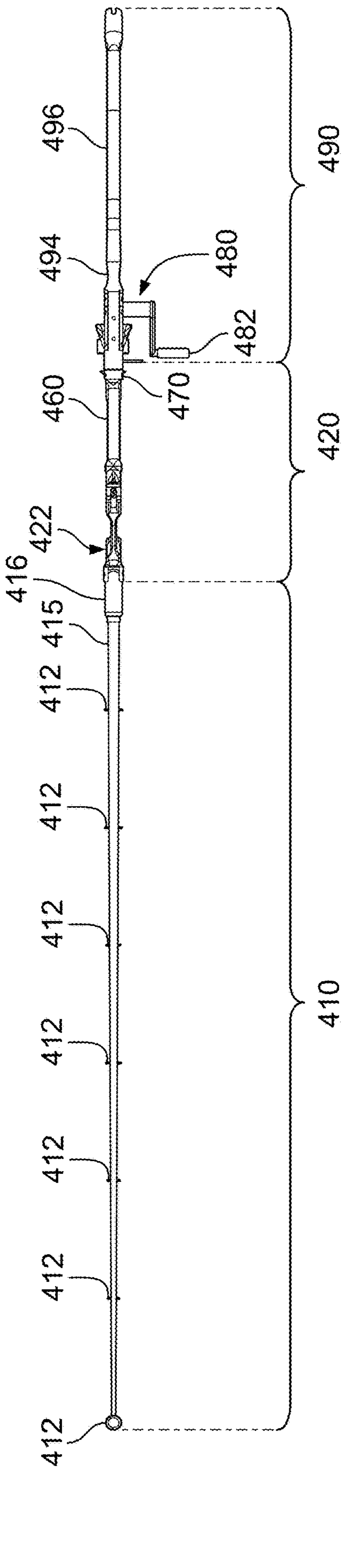
FIG. 17 is a top view of the fishing rod of FIG. 16.
Figure 18:
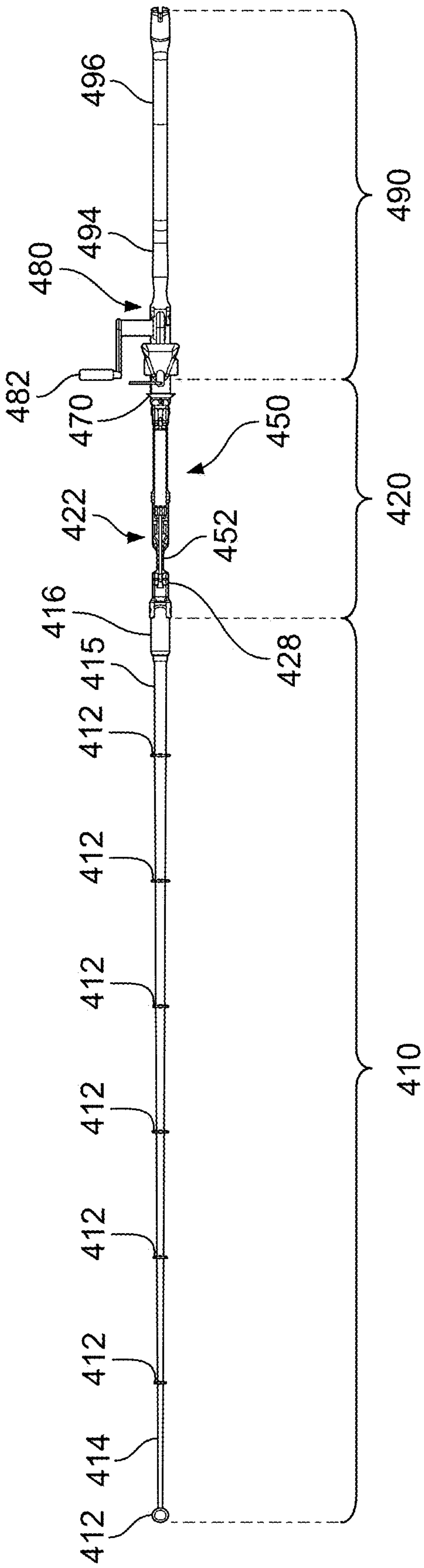
FIG. 18 is a bottom view of the fishing rod of FIG. 16.
Figure 19:
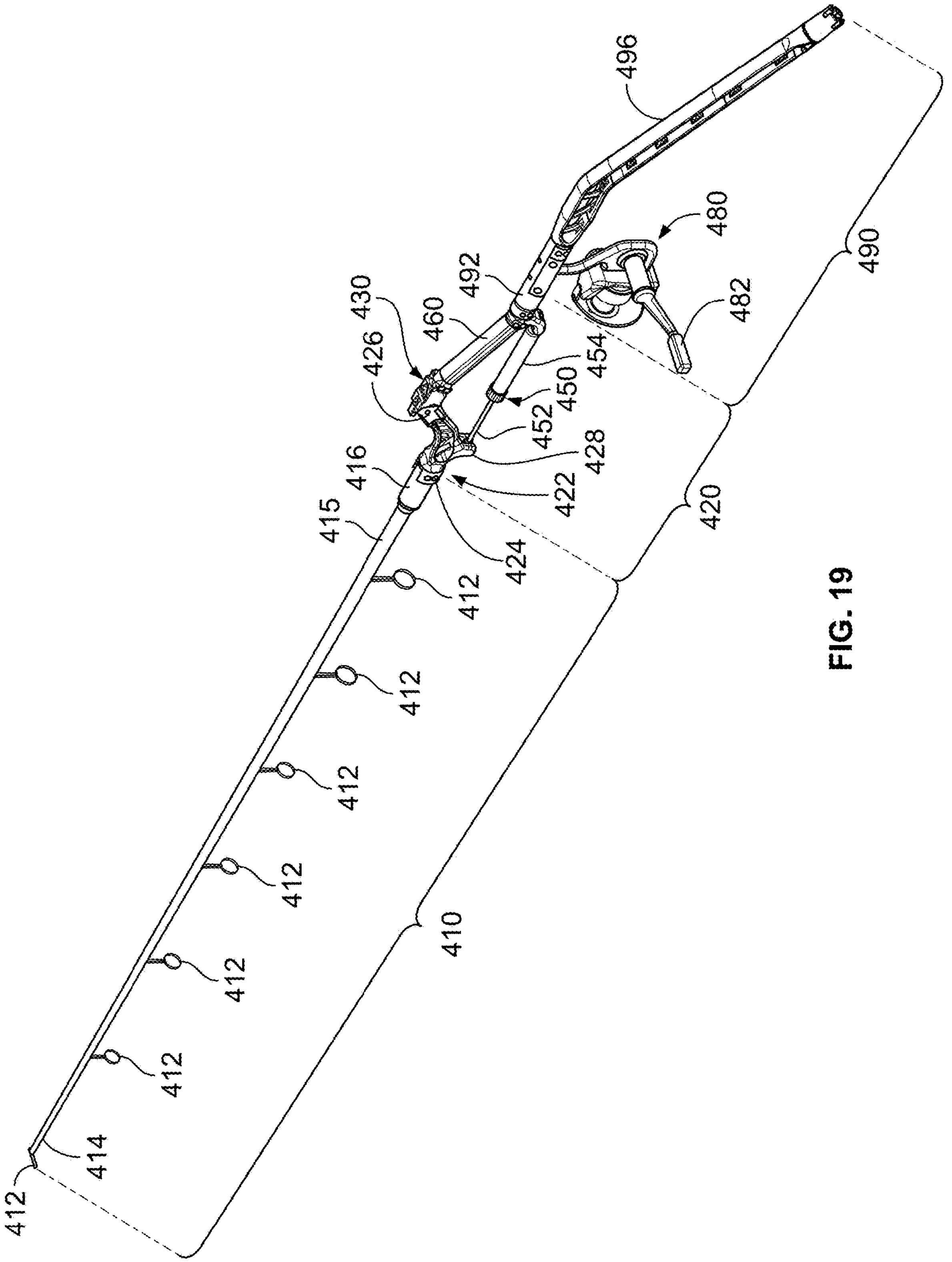
FIG. 19 is a top perspective view of the fishing rod of FIG. 16.
Figure 20:
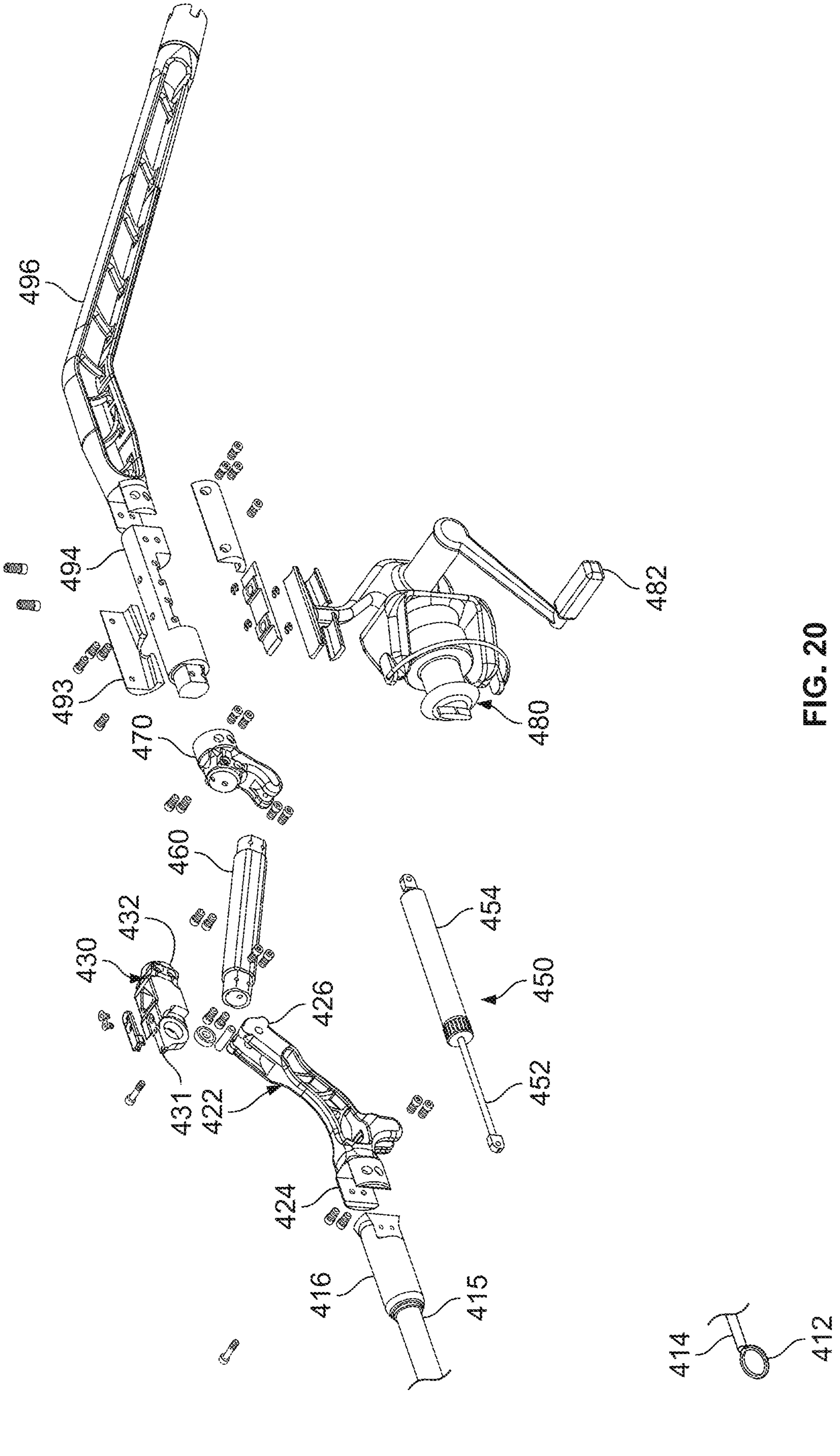
FIG. 20 is an exploded view of select components of the rod of FIG. 16.
Figure 21:
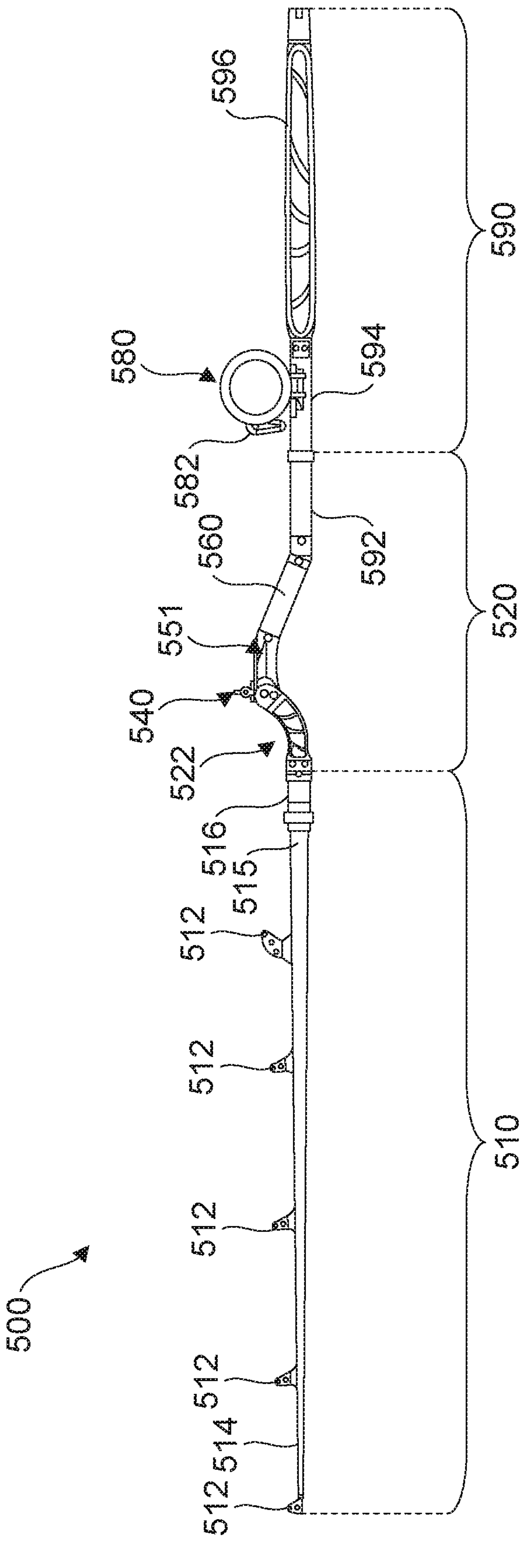
FIG. 21 is a left side view of a fifth embodiment of a fishing rod according to the present invention.
Figure 22:
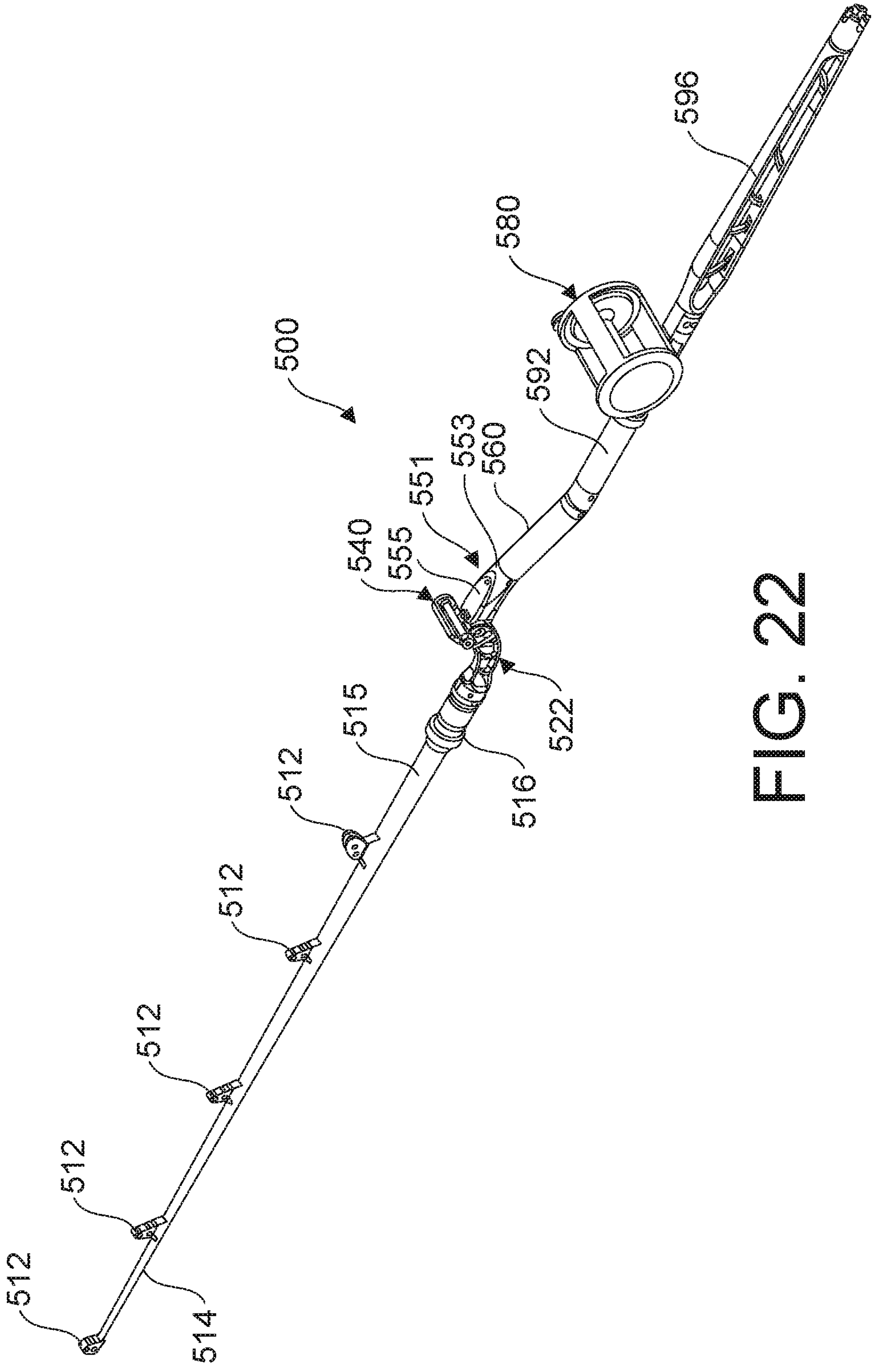
FIG. 22 is a top perspective view of the fishing rod of FIG. 21.
Figure 23:
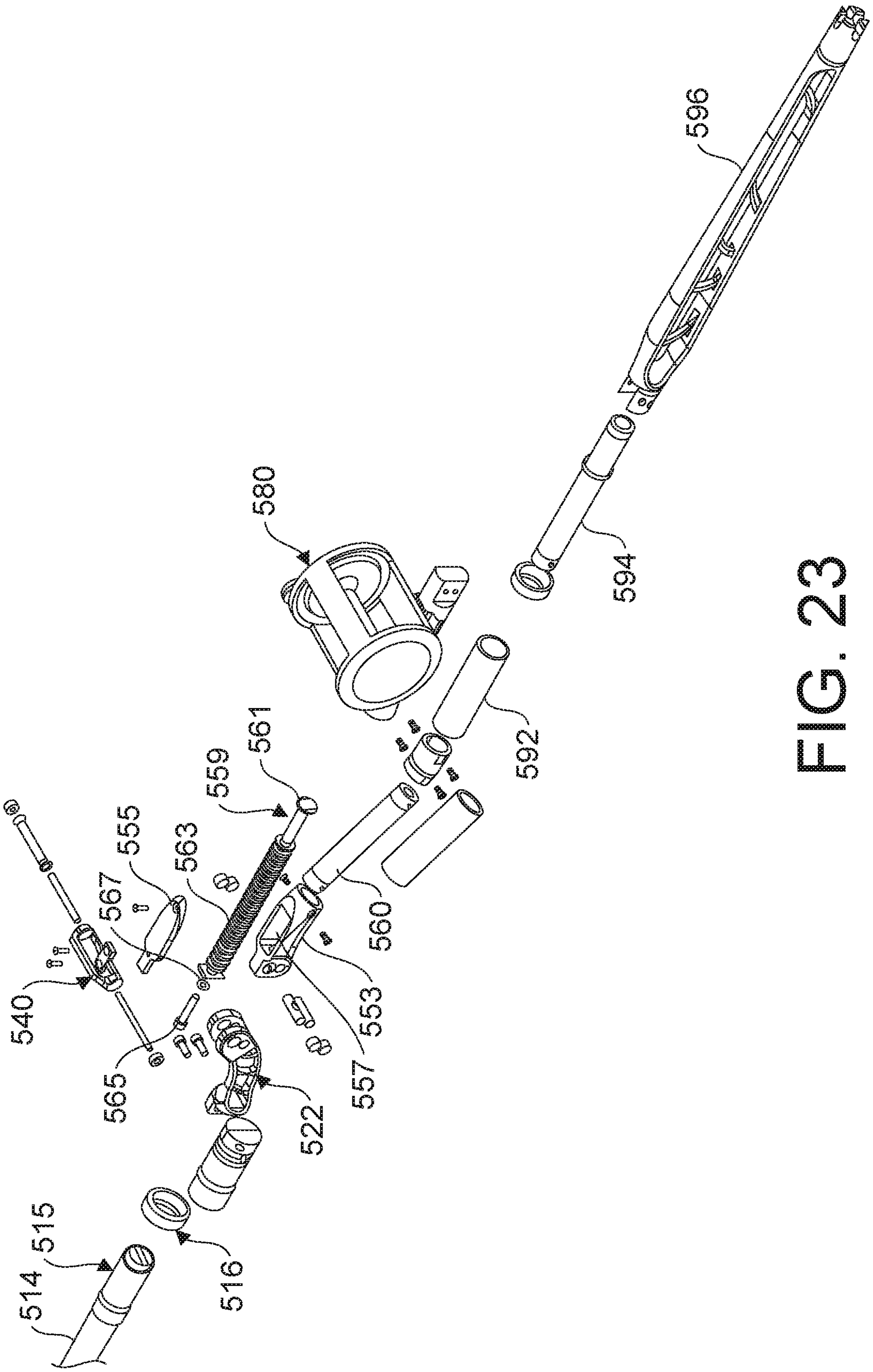
FIG. 23 is an exploded view of select components of the rod of FIG. 21.
Figure 24:
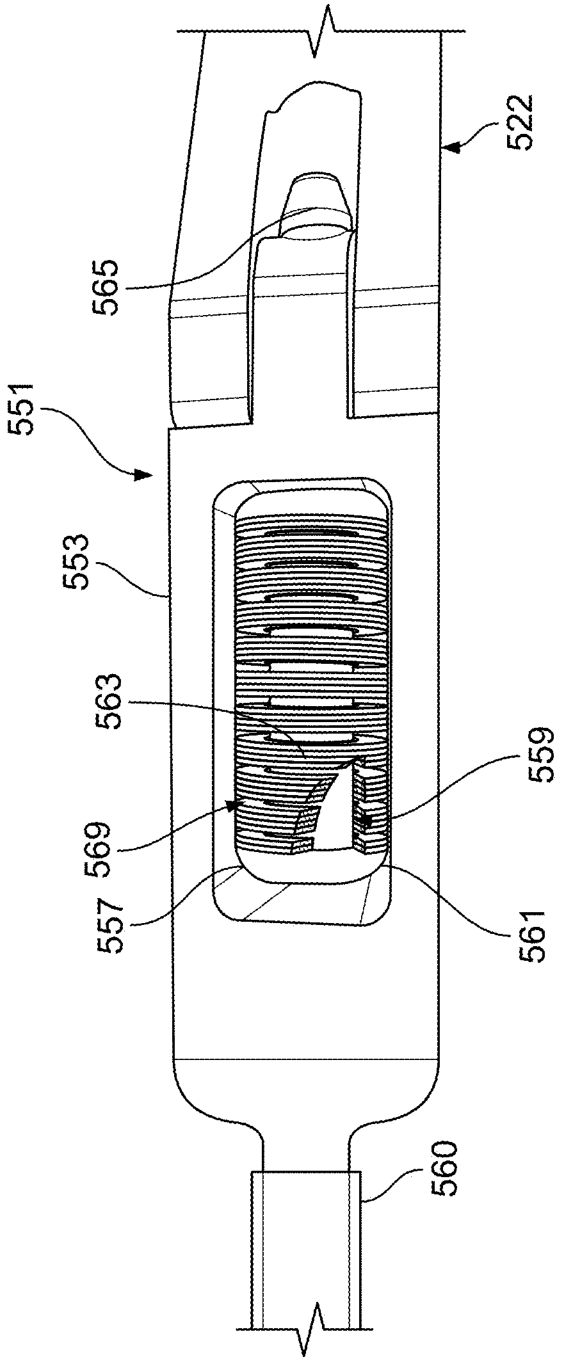
FIG. 24 is a detailed, break-away top view of select components of the rod of FIG. 21.
Figure 25:
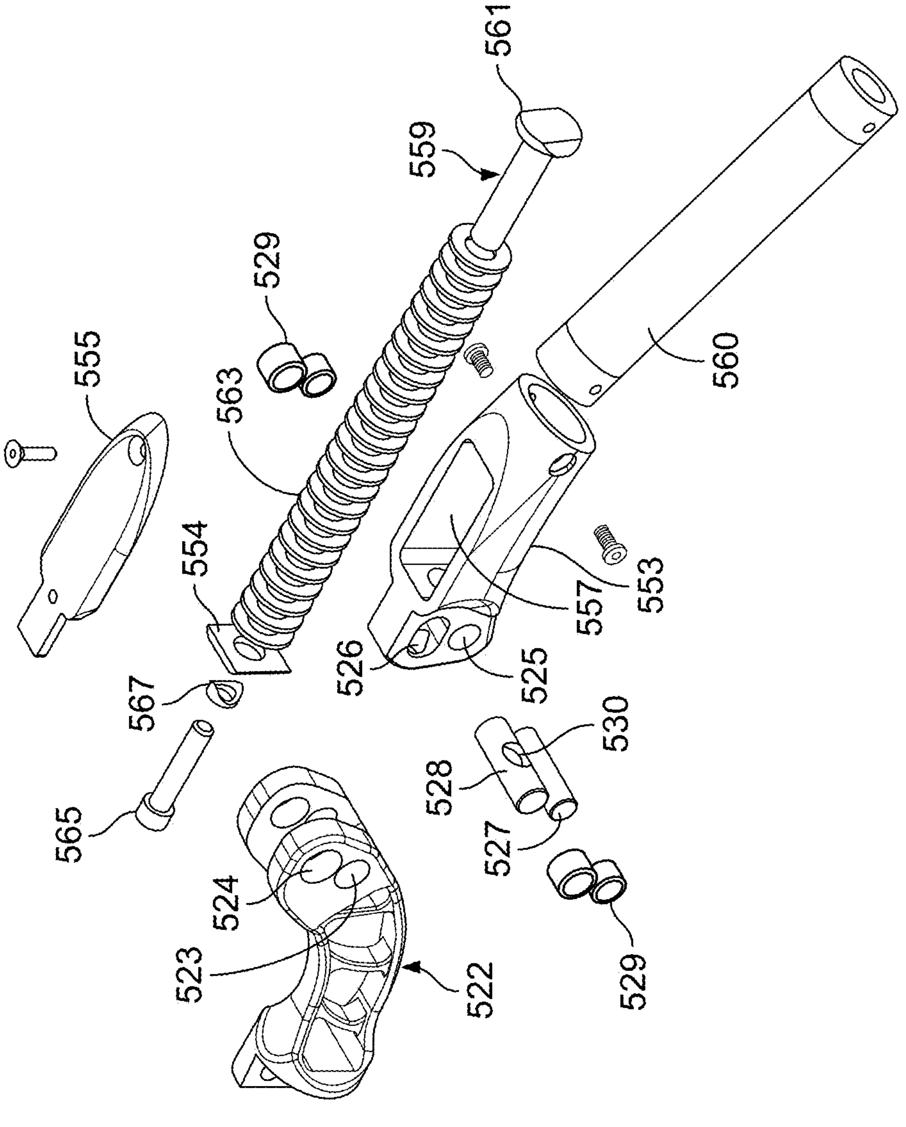
FIG. 25 is a close-up view of select components shown in FIG. 23.
Figure 26:
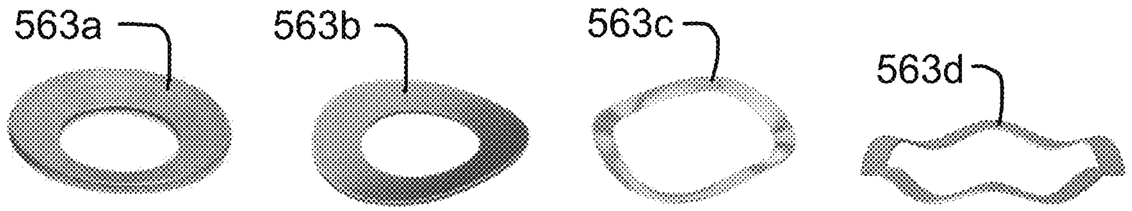
FIG. 26 is a front perspective view of various spring washers.

FIGS. 8-11 depict an embodiment of a fishing rod 200 having the same or similar elements and operation as rod 100, with the exception that proximal handle 296 is angled/bent rather than straight (see FIGS. 9 and 11). This configuration of proximal handle 296 is known in the art as a bent butt, and its advantages, variations and limitations are well known in the art. Apart from this variation, an angler uses and controls rod 200 in generally the same fashion as rod 100.

In various embodiments, proximal handle 196/296 may have any other configuration and/or shape. In various embodiments, proximal handle 196/296 may be made from, or covered with materials such as foam, to increase its ease of use, durability and versatility.

FIGS. 12-15 depict an embodiment of a fishing rod 300 having the same or similar elements and operation as rod 100 and/or rod 200, with the exception that reel 380 is a spinning reel rather than a trolling reel. As is known in the art, spinning reel 380 is mounted on the lower-facing surface of rod 300, along with eyelets 312. An angler uses and controls rod 300 in generally the same fashion as rod 100 and/or 200.

FIGS. 16-20 depict an embodiment of a fishing rod 400 having the same or similar elements and operation as rod 100, rod 200 and/or rod 300, except with an angled/bent proximal handle 496 (like proximal handle 296 discussed above) and a spinning reel 480 (like spinning reel 380 discussed above). Spinning reel 480 is mounted on the lower-facing surface of rod 400, along with eyelets 412. An angler uses and controls rod 400 in generally the same fashion as rod 100, rod 200 and/or 300.

FIGS. 21-29 depict an embodiment of a fishing rod 500 having the same or similar elements and operation as rod 100, rod 200, rod 300 and/or rod 400, with the exception of an upper grip, or riser, 551 that functions as an actuator. More particularly, riser 551 includes one or more springs, in the form of elastically compressible washers, or spring washers 563 (as further discussed below) instead of shock absorber 150 to transfer force from distal section 510 to proximal section 590, and thereby enhance the ability of the angler to play a hooked fish, while reducing the angler's fatigue in battling the fish.

Riser 551 extends between distal handle 560 and split coupler 522. With reference to FIGS. 22-25, riser 551 includes a body 553 with a lid 555 and an interior cavity 557. On its distal end that connects to split coupler 522, body 553 of riser 551 has a lower pivot hole 525 and an upper slot 526. The pivot hole 525 and slot 526 optionally go all the way through body 553. The pivot hole 525 and slot 526 on body 553 are complimented on split coupler 522 with a mating lower pivot hole 523*a* and an upper translation hole 523*b* each of which traverse the split coupler 522 all the way across it, or said otherwise, are on both sides of the fork of the split coupler 522.

When pivot hole 525 is positioned in between and coaxially aligned with pivot holes 523*a*, pivot pin 527 is inserted through the common opening formed thereby and used to couple the body 553 to the split coupler 522. This connection creates a fixed pivot point. Additionally, when slot 526 is positioned in between translation holes 523*b*, translation pin 528 is inserted through the common opening formed thereby and used to translatably couple the body 553 to split coupler 522. The length of slot 526 enables a certain amount of travel on either side of translation pin 528. Those skilled in the art will readily recognize the variability and permutations to this design, such as for example, having a longer slot and/or a smaller pin. End caps 529 are put on both sides of the translation pin 528 and pivot pin 527 to prevent them from disengaging with the split coupler 522—body 553 assembly. Of course, other means to secure the pins in place are well known and contemplated.

Translation pin 528 has a bolt hole 530 that penetrates through it normal to its long axis. This bolt hole is coaxially aligned with the bolt 559 that will be positioned in cavity 557, such that bolt 559 can pass through bolt hole 530. In assembly, washers 563 are placed onto bolt 559, followed by an optional end plate 554. The bolt 559 is then positioned into cavity 557 and through bolt hole 530 such that end plate 554 and washers 563 are sandwiched in cavity 557 against the bolt head 561. The term "bolt", as used here, and elsewhere, is not meant to be limiting, but only used for ease of reference and simplicity. Any other article or combination of articles that accomplish the described function is contemplated. As one alternatively, the term "shaft" may be used also.

On the end of the bolt 559 opposite its head 561 (which end sticks out beyond the translation pin 528) will be placed a spacer/washer 567. The proximal-facing side of the spacer 567 has an optionally curved surface designed to matingly engage the curved outer surface of the translation pin 528. On its distal side, the spacer 567 has an optional flat face intended to make contact with the head of a screw or bolt 565 which gets threaded into the shaft of bolt 559, thus completing the spring construct. Finally, the cavity 557 of the body 553 is closed with the lid 555.

In operation, when the rod 500 bends, as the body 553 rotates about pivot pin 527, and the slot 526 moves in a direction away from split coupler 522 (until translation pin 528 prevents it from moving any farther), because the bolt is captured (essentially pinned) at the translation pin 528 by virtue of its connection through washer 567 to bolt 565, the head 561 of bolt 559 compresses the resilient washers 563 inside the cavity 557. The energy generated in the compressed washers 563 then helps straighten the rod and ease the fatigue of the angler.

It will also be observed that as bolt 565 is screwed in, or threaded farther into, the shaft of bolt 559, it is bolt 559 that moves towards bolt 565, and consequently the head 561 of bolt 559 compresses washers 563 inside the cavity 557 of body 553. This mechanism, the turning of bolt 565, can be used to adjust the spring force, or tension, in the riser 551. Such adjustment may be optionally performed when the rod 500 is first assembled, and/or even during a fish fight.

As thusly described, interior cavity 557 contains bolt 559 with elastically compressible washers 563 arranged on bolt 559, optionally in groups, so as to define spaces, or gaps, 569 therebetween that provide room for washers 563 to be compressed and then return to their uncompressed state. In one embodiment, gaps 569 occur every fourth washer 563.

With particular reference to FIGS. 26-29, in various embodiments, washers 563 are Belleville spring washers, such as washers 563*a*, 563*b*, 563*c*, or 563*d*, which are designed to elastically deform under load. In one embodiment, Belleville washers 563 are each configured to compress about 0.020". In another embodiment, washers 563 all compress to collectively move the total distance required to generate a pressure level that facilitates the force transfer from distal section 510 to proximal section 590. In one embodiment, the total distance that washers 563 collectively move is 0.250".

Figure 27:
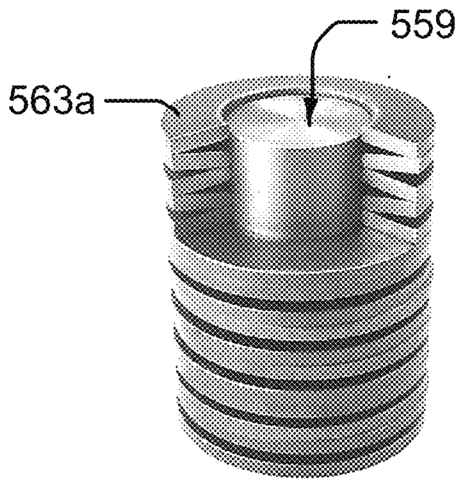
FIG. 27 is a front perspective view of a configuration of spring washers assembled on a rod.
Figure 28:
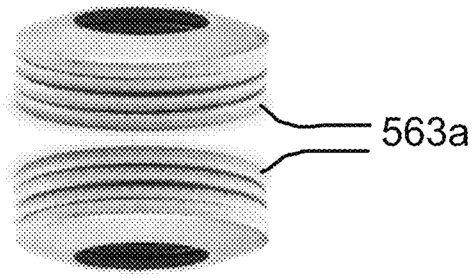
FIG. 28 is a front perspective view of another configuration of spring washers.

Washers 563 may be stacked on bolt 559 in a configuration that provides a total compressive travel distance (i.e., 0.250") that is required to generate the desired pressure level. For example, this type of arrangement is depicted in FIG. 27 with washers 563*a* arranged on top of each other, back to front, on (a section of) bolt 559. Of course, washers of different dimensions and spring forces, such as washers 563*a*, 563*b*, 563*c*, or 563*d*, may be selected of the same or different types, and assembled in various configurations to achieve numerous different performance criteria for a rod. For example, as depicted in FIG. 28, washers 563*a* may be stacked five in one direction, and five in another, and then assembled onto bolt 559 (which would go through their open centers) in such configuration to provide a particular spring force characteristic.

Figure 29:
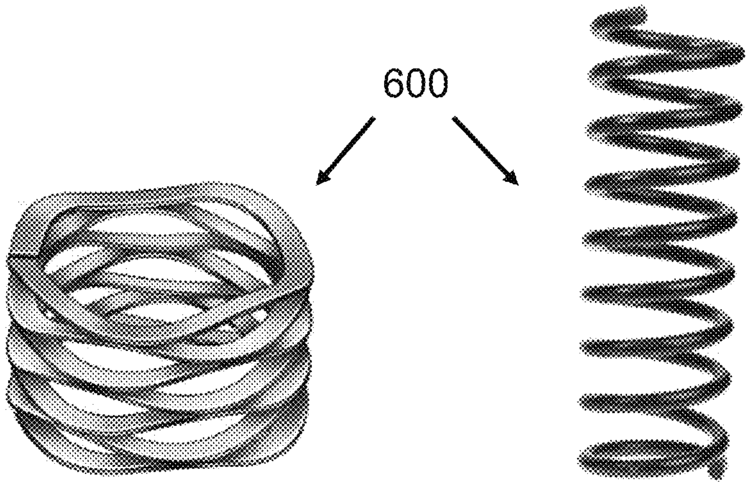
FIG. 29 is a front perspective view of various springs.

Of course, it is recognized that instead of spring washers 563, various springs, such as springs 600 depicted in FIG. 29, may also be used alone or in combination, to create the spring forces discussed above.

The ability to control the attenuation of washers 563 or springs 600 along bolt 559, coupled with the improved positioning of, and transmission of the angler's forces through, distal handle 560, enhances the ability of the angler to play a hooked fish, while reducing the angler's fatigue in battling the fish.

Optionally, fishing rod 100 may be of unitary construction, or modular. The three fishing rod 100 sections, namely the distal section 110, intermediate section 120, and proximal section 190, may be separately replaceable, or exchangeable with similar functioning sections that have different characteristics. For example, intermediate section 120 may be swapped out for intermediate section 420. Or proximal section 190 may be swapped out for proximal section 290. Or distal section 110 may be swapped out for another distal section that is longer, and/or stiffer, and/or has more or fewer eyelets 112 on it.

It is readily recognized, and contemplated by this disclosure, that many other forms and mechanisms of connecting one rod section to another are possible. Thus, it is further contemplated that different sections may be provided, or sold, separately.

Importantly, it is also readily understood that the shock absorption mechanism, or feature, of the present invention may be located in either of the proximal section 190, intermediate section 12, or distal section 110, or in more than one of those sections.

While various embodiments of the present disclosure have been described in detail, it is apparent that modifications and alterations of those embodiments will occur to those skilled in the art. It is expressly understood that such modifications and alterations are within the scope and spirit of the present disclosure, and are contemplated hereby.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed invention requires more features than are expressly recited in each claim.

Again, though the present disclosure has included description of one or more embodiments and certain variations and modifications, other variations and modifications are within the scope of the disclosure, e.g., as may be within the skill and knowledge of those in the art, after understanding the present disclosure. This disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are explicitly disclosed herein, and without intending to dedicate any patentable subject matter to the public.

What is claimed is:

1. A force absorbing device adapted for connection between a proximal handle section of a fishing rod having a reel and a distal section of the fishing rod having a long axis, the force absorbing device adapted to absorb a portion of a bending force between the proximal handle section and distal section of the rod when the bending force is applied to the distal section of the fishing rod when fighting a fish, the force absorbing device comprising:

a handle having a proximal end and a distal end, an actuator having a proximal end and a distal end, and a coupler having a proximal end and a distal end, in use the proximal end of the handle of the force absorbing device is adapted for connection to the handle section of the fishing rod and the distal end of the coupler is adapted for connection to the distal section of the fishing rod, the actuator proximal end is connected to the distal end of the handle, the proximal end of the coupler is pivotally connected to the distal end of the actuator to allow the coupler to pivot between a first and a second position relative to the actuator as the bending force is applied to the distal section of the fishing rod when fighting a fish, the handle of the force absorbing device is oriented at an angle to the long axis of the distal section of the fishing rod when the proximal end of the handle of the force absorbing device is connected to the handle section of the fishing rod and the distal end of the coupler is connected to the distal section of the fishing rod and is adapted so as to form a gripping surface for a user while fighting the fish, a portion of the coupler is oriented at an angle to the long axis of the distal section of the fishing rod when the distal end of the coupler is connected to the distal section of the fishing rod, the actuator contains a dampening member therein adapted to absorb a portion of the bending force applied to the distal section of the fishing rod as the coupler pivots between the first and second positions, wherein the dampening member of the actuator consists of a spring element mounted on a bolt inside the actuator, the bolt having a threaded end and a head on an end opposite the threaded end, wherein the spring element is positioned on the bolt in a space between the head of the bolt and a screw threaded into the threaded end of the bolt.

2. A force absorbing device adapted for connection between a proximal handle section of a fishing rod having housing a reel and a distal section of the fishing rod having a long axis, the force absorbing device adapted to absorb a portion of a bending force between the proximal handle section and distal section of the rod when the bending force is applied to the distal section of the fishing rod when fighting a fish, the force absorbing device comprising:

a handle having a proximal end and a distal end, an actuator having a proximal end and a distal end, and a coupler having a proximal end and a distal end, in use the proximal end of the handle of the force absorbing device is adapted for connection to the handle section of the fishing rod and the distal end of the coupler is adapted for connection to the distal section of the fishing rod, the actuator proximal end is connected to the distal end of the handle, the proximal end of the coupler is pivotally connected to the distal end of the actuator to allow the coupler to pivot between a first and a second position relative to the actuator as the bending force is applied to the distal section of the fishing rod when fighting a fish, the handle of the force absorbing device is oriented at an angle to the long axis of the distal section of the fishing rod when the proximal end of the handle of the force absorbing device is connected to the handle section of the fishing rod and the distal end of the coupler is connected to the distal section of the fishing rod and is adapted so as to form a gripping surface for a user when fighting the fish, a portion of the coupler is oriented at an angle to the long axis of the distal section of the fishing rod when the distal end of the coupler is connected to the distal section of the fishing rod, the actuator contains a dampening member therein adapted to absorb a portion of the bending force applied to the distal section of the fishing rod as the coupler pivots between the first and second positions, wherein the damping member of the actuator consists of a plurality of elastically compressible washers mounted on a bolt inside the actuator, the bolt having a threaded end and a head on an end opposite the threaded end, wherein the elastically compressible washers are positioned on the bolt in a space between the head of the bolt and a screw threaded into ente the threaded end of the bolt.

3. The force absorbing device of claim 2, wherein the space between the screw threaded into the bolt and the head is adjustable by rotation of the screw relative to the bolt to thereby produce different absorption levels for the actutator.

* * * * *